United States Patent
Numano et al.

(10) Patent No.: US 6,411,346 B1
(45) Date of Patent: Jun. 25, 2002

(54) ACTIVE MATRIX LCD IN WHICH A CHANGE IN THE STORAGE CAPACITANCE CS DUE TO HAVING MULTIPLE EXPOSURE REGIONS IS COMPENSATED FOR BY A CHANGE IN THE COUPLING CAPACITANCE CGD

(75) Inventors: Yoshinori Numano; Satoru Kawamoto; Ken Nakashima, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,150

(22) Filed: Dec. 22, 1998

(30) Foreign Application Priority Data

Jun. 16, 1998 (JP) ............................. 10-168175

(51) Int. Cl.[7] ........................................... G02F 1/1343
(52) U.S. Cl. ....................................................... 349/39
(58) Field of Search ..................................... 349/38, 39

(56) References Cited

U.S. PATENT DOCUMENTS

| | | | | |
|---|---|---|---|---|
| 5,796,448 A | * | 8/1998 | Kim | 349/39 |
| 5,859,683 A | * | 1/1999 | Tagusa et al. | 349/138 |
| 6,091,464 A | * | 7/2000 | Song | 349/38 |

FOREIGN PATENT DOCUMENTS

| | | | | |
|---|---|---|---|---|
| JP | 6-202158 | * | 7/1994 | |
| JP | 6202158 A | * | 7/1994 | G02F/1/136 |
| JP | 6-235938 | * | 8/1994 | |
| JP | 9-243999 | | 9/1997 | |
| JP | 9-258247 | | 10/1997 | |
| JP | 9-304790 | * | 11/1997 | |

* cited by examiner

Primary Examiner—Toan Ton
Assistant Examiner—Andrew Schechter
(74) Attorney, Agent, or Firm—Oblon, Spivak, McClelland, Maier & Neustadt, P.C.

(57) ABSTRACT

A liquid crystal displaying apparatus which is high in displaying quantity is provided, wherein the displaying quantity reduction such as flickering, image sticking, ununiformly displaying and so on which is caused due to changes for each exposing region of the ΔVgd. In the liquid crystal displaying apparatus of the present invention, a plurality of scanning wirings and a plurality of signal wirings, TFTs and pixel electrodes are formed. Storage capacitance for retaining the electric charge is connected with the pixel electrode, another electrode opposite to an electrode for forming the storage capacitance and the drain electrode of the TFT are formed at the same time, an array substrate where another electrode is superposed on the scanning wiring and the signal wiring through the transparent insulating film, and a liquid crystal displaying provided with an counter substrate having a common electrode to be arranged opposite to the pixel electrode. The change in the ΔVgd due to changes in the Cgd to be caused for each exposing area is compensated by changing the Cs value for each exposing region.

5 Claims, 29 Drawing Sheets

ACTIVE MATRIX LCD IN WHICH A CHANGE IN THE STORAGE CAPACITANCE CS DUE TO HAVING MULTIPLE EXPOSURE REGIONS IS COMPENSATED FOR BY A CHANGE IN THE COUPLING CAPACITANCE CGD

BACKGROUND OF THE INVENTION

1. Field of the Invention

The present invention relates to a liquid crystal displaying apparatus, and more particularly, to an active matrix type liquid crystal displaying apparatus.

2. Discussion of the Background

The array substrate of the conventional active matrix type liquid crystal displaying apparatus has a plurality of scanning wirings (or lines) in a row direction, and a plurality of signal wirings (or lines) in a column direction formed on an insulating substrate, thin film transistors (hereinafter, referred to as TFT(s)) formed in the intersecting positions of the scanning wirings and the signal wirings, and each pixel including a of pixel electrode connected with the TFT, an alignment film being formed on the pixel. Another substrate (hereinafter referred to as counter substrate) for interposing the liquid crystal has a common electrode on the insulating substrate, and an alignment film being formed on the common electrode. The array substrate and the counter substrate are confronted with each other in the face where the aforementioned pixel electrode and the common electrode are formed to interpose the liquid crystal composition in the gap between the array substrate and the counter substrate. As the alignment film is subjected to alignment process in a direction deviated by 90 degrees on the array substrate side and the counter substrate side, a TN liquid crystal is used with the liquid crystal molecule being twisted by 90 degrees in a thickness direction.

In such a TN type liquid crystal displaying apparatus, to prevent the leaking light from coming from the gap by removing the gap between the pixel electrode, the scanning wiring and the signal wiring in the periphery, and at the same time, to prevent disclination caused by the level difference of the pixel electrode end from the scanning wiring and the signal wiring and by the horizontal direction electric field between the pixel electrode and the scanning wiring or the signal wiring, there is disclosed such an art of forming a transparent insulating film with a film of 1 µm or thicker and forming the pixel electrode on the scanning wiring and the signal wiring through the transparent insulating film. Thus, the disclination is prevented from being caused, and at the same time, the pixel electrodes can be superposed on the scanning wiring and the signal wiring so that the aperture ratio of one pixel can be made larger.

FIG. 33 is a plan view of one pixel of a liquid crystal displaying apparatus using an art to form, on the scanning wiring and the signal wiring through the transparent insulating film, the conventional pixel electrode described in, for example, Japanese Unexamined Patent Publication No. 258247/1997. FIG. 34 is a sectional illustrating view taken along a line of A—A of FIG. 33. Referring to FIGS. 33 and 34, reference numeral 1 is a transparent substrate, reference numeral 2 is a scanning wiring, reference numeral 3 is a storage capacitance line (hereinafter referred to as Cs line), reference numeral 4 is a gate insulating film, reference numeral 5 is a semiconductor layer, reference numeral 6 is a semiconductor layer with impurities being doped in it, reference numeral 6a is a source region for taking a signal wiring metal and an ohmic contact, reference numeral 6b is a region for taking a drain electrode metal and an ohmic contact, reference numeral 7 is a signal wiring, reference numeral 8 is a drain electrode, reference numeral 9 is a passivation film, reference numeral 10 is an organic transparent resin film, and reference numeral 11 is a contact hole (or contact via) for electrically connecting the drain electrode 8 with a pixel electrode. Reference numeral 12 is a pixel electrode where the position is shown with two-dot chain line. In the conventional liquid crystal displaying apparatus shown in FIGS. 33 and 34, these films normally form a resist pattern on the film by a process called a photolithography, and by removing the film of an unnecessary portion by etching of the resist pattern on the mask, the desired shape is obtained. To form the resist pattern by the photolithography process, an exposing machine is used. In the negative resist, the light is illuminated by shielding the light in the unnecessary portion of the film. In the positive type resist, the light is illuminated by shielding the light in the necessary portion of the film. Later, the resist of the unnecessary portion is removed by using a developing solution to form the desired resist pattern. In the exposing process in the photolithography, by using an exposing apparatus called a stepper, the displaying portion of the liquid crystal displaying apparatus is divided into some regions and the exposing is conducted for each region, whereby the whole displaying portion is exposed by several exposing operations. At this time, the exposing condition is changed in the step in the boundary of the adjacent exposing region by the results in the alignment accuracy of the exposing apparatus and the difference in uniformity of the exposing amount for each exposing region. Thus, the positional deviation between the patterns positioned in the different layers are changed in the step condition in the boundary of the adjacent exposing region. In the conventional liquid crystal displaying apparatus shown in FIG. 33, the drain electrode 8 also acts as an electrode for forming the storage capacitance. Accordingly, in the case of the conventional liquid crystal displaying apparatus shown in FIG. 33, when the pattern position of the scanning wiring 2 and the drain electrode 8 are deviated in the x axial direction of FIG. 33, the coupling capacitance Cgd formed by the superposition between the scanning wiring 2 and the drain electrode 8 in the TFT portion is changed and the relative position between the scanning wiring 2 and the drain electrode is changed, thereby changing the superposed area to change the value. The storage capacitance Cs is formed by the same photolithography process in the scanning wiring 2 and the Cs wiring 3. If the position of the drain electrode 8 is deviated in the x axial direction shown in FIG. 33, the superposing area of the Cs wiring 3 and the drain electrode 8 does not change, thus making the Cs value constant.

Influences of the change in the Cgd upon the picture quality will be described. FIG. 35 shows an equivalent circuit of one pixel of the liquid crystal displaying apparatus. For a simpler description, only the capacity composition of the present invention will be described. When an ON signal enters, the TFT 23 is turned on, whereby a prescribed electric charge is stored from the signal wiring 7 into the storage capacitance (Cs) 21 and the liquid crystal capacitance (Clc) 22. When the selection signal of the scanning wiring 2 is changed to off, the TFT is turned Off (high resistance condition), and the charge stored from the signal wiring is retained. The effective voltage to be decided by difference the between the electric potential to be decided by the electric charge and that of the Cs wiring (that is, common electrode of the counter substrate) is applied upon the liquid crystal, whereby the transmission ratio proportional to the effective voltage is obtained and the desired display is obtained. When the selecting signal of the scanning wiring 2 is changed, the electric potential of the drain electrode is changed by the coupling capacitance (Cgd) 24 between the scanning wiring 2 and the drain electrode 8. ΔVgd is as follows:

$$\Delta Vgd = (Cgd \times \Delta Vg)/(Cgd + Cs + Clc) \quad (1)$$

wherein the electric potential change of the drain electrode is ΔVgd.

The ΔVg is a change amount of the electric potential when the signal of the scanning wiring is changed from on to off. The center potential of the electric potential 25 (hereinafter referred to as Vcom) of the common electrode of the counter substrate and the center electric voltage of the voltage to be applied upon the liquid crystal are deviated by the electric change ΔVgd of the drain electrode. When the deviation causes the flickering (hereinafter referred to as flicker) of the picture, and a phenomenon (hereinafter referred to as image sticking) where the previous pattern remains even in the display switching when the same pattern is displayed continuously for long hours, thus deteriorating the display quality. The display quantity is prevented from being lowered normally by setting the center electric potential of the Vcom 25 to the ΔVgd.

In the case of the conventional liquid crystal displaying apparatus shown in FIG. 33, the Cgd 24 changes in the boundary of the exposing region, but the storage capacitance Cs21 does not change, whereby the ΔVgd changes for each exposing region. Since the center electric potential of Vcom 25 cannot be changed for each exposing region, a region, deviated from the center potential of the optimum Vcom 25, a region deviated from the center electric potential of the optimum Vcom 25, is caused without fail, and the flickering, image sticking and so on are caused, with a problem of deteriorating the display quality.

When the varying amount of the electric potential of the drain electrode by the ΔVgd is different for each exposing region, the effective voltage to be applied upon the liquid crystal is changed if the same signal electric potential is given, and the transmission ratio of the liquid crystal changes. When the ΔVgd is different for each exposing region, the transmission ratio becomes different among the regions, with a problem of visually recognizing them as a nonuniform display.

The present invention is conducted, considering the problems of the conventional active matrix type liquid crystal displaying apparatus. An object of the present invention is to provide a liquid crystal displaying apparatus of high display quality by preventing the display qualities such as flickering, image sticking, ununiformly displaying and so on from being reduced, which are caused by variation for each exposing region of the ΔVgd.

A liquid crystal displaying apparatus of the present invention comprises;

(a-1) a plurality of scanning wirings and a plurality of signal wirings to be arranged respectively in a row direction and a column direction, (a-2) a TFT arranged in a matrix condition and controlled by the scanning wiring and the signal wiring, (a-3) wherein the pixel electrode to be connected with the TFT is formed, the storage capacitance for retaining the electric charge is connected with the pixel electrode, another electrode opposite to the electrode for forming the storage capacitance and the drain electrode of the TFT are formed at the same time, and the scanning wiring and an electrode for forming the storage capacitance are formed by the same step, (b) an array substrate with the pixel electrode superposed on the scanning wiring and the signal wiring through the transparent insulating film, and a display crystal displaying apparatus provided with an counter substrate of a common electrode arranged opposite to the pixel electrode, so as to compensate the change in the ΔVgd due to change in the Cgd to be caused for each exposing area by changing the Cs value for each exposing region.

A liquid crystal displaying apparatus of the present invention increases an area for forming the storage capacitance when the superposing area between the scanning wiring and the drain electrode, and an area for forming the storage capacitance also decreases when the superposing area between the scanning wiring and the drain electrode decreases.

A liquid crystal displaying apparatus of the present invention is adapted to change the Cs value so that (1) equation ΔVgd=(Cgd×ΔVg)/(Cgd+Cs+Clc) may become a constant value if the Cgd is changed.

In a liquid crystal displaying apparatus of the present invention, the transmission amount for transmitting the opening portion does not change even if the area of the storage capacitance is increased and decreased.

In a liquid crystal displaying apparatus of the present invention, at least one portion of the drain electrode is a transparent electrode.

In a liquid crystal displaying apparatus of the present invention, the width of the drain electrode is changed at steps or gradually to prevent the level difference cutting at the level difference of another electrode.

In a liquid crystal displaying apparatus of the present invention, the change in the aperture ratio, to be caused with increasing and decreasing in the area of the storage capacitance, may not be changed due to smaller light shielding area when the area of the storage capacitance increases, and larger light shielding area when the area of the storage capacitance become small.

In the conventional liquid crystal displaying apparatus, the ΔVgd changes for each exposing region, because the Cgd changes in the boundary of the exposing region, but the storage capacitance does not change. As the center electric potential of the Vcom cannot be changed for each superposing region, a region which is deviated from the center electric potential of the optimum Vcom is caused without fail to cause flickering, image sticking and so on, thus deteriorating the display quality.

When the varying amount of the electric potential of the drain electrode by the ΔVgd changes in each exposing region, the effective voltage to be applied upon the liquid crystal changes if the same signal electric potential is given, and the transmission ratio changes among the regions, which is visually recognized as a nonuniform display.

In a configuration having the storage capacitance for compensating the change of the Cgd in each exposing region of the present invention, the ΔVgd value becomes constant even if the exposing region is different, displaying quality reduction such as flickering, image sticking, ununiformly displaying and so on can be prevented, whereby a liquid crystal displaying apparatus is provided which is high in display quality, easy to manufacture and high in yield.

In the present invention, by having configurations for compensating the change in the aperture ratio in causing the Cs values for each exposing region, the quantity of the transmission light of one pixel of the liquid crystal displaying apparatus does not change if the Cs value changes. Thus, the ΔVgd is constant even if the exposing regions are different, quantity of the transmission light can be made unchanged, and the displaying quality reduction such as flickering, image sticking, nonuniform displaying and so on can be prevented. Thus, a liquid crystal displaying apparatus of better displaying quality which is free from nonuniform displaying by changing among the exposing regions in the quantity of the transmitting light can be obtained, wherein the manufacturing is easier and the yield is higher.

In the present invention, by using a transparent drain electrode, the quantity of the transmission light one pixel of the liquid crystal displaying apparatus does not change if the Cs value changes. Thus, the ΔVgd is constant and the quantity of the transmitting light does not change even if the exposing regions are different, the quantity of the transmission light can be made unchanged, and the displaying quantity reduction such as flickering, image sticking, nonuniform displaying and so on can be prevented. Thus, a liquid crystal displaying apparatus of better displaying quality where it is free from nonuniform displaying as the quantity of the transmitting light does not change among the exposing regions be obtained and the illuminance is high, wherein the manufacturing is easier and the yield is higher.

In the present invention, by improving the wiring shape for forming the drain electrode and the storage capacitance, and changing at steps or gradually, the drain electrode prevents the level difference cutting in the step difference to the wiring for forming the storage capacitance. Thus, the ΔVgd is constant even if the exposing regions are different, and the displaying quality reduction such as flickering, image sticking, nonuniform displaying and so on can be prevented. A liquid crystal displaying apparatus which is high in yield can be obtained.

BREIF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

Figure 4A:
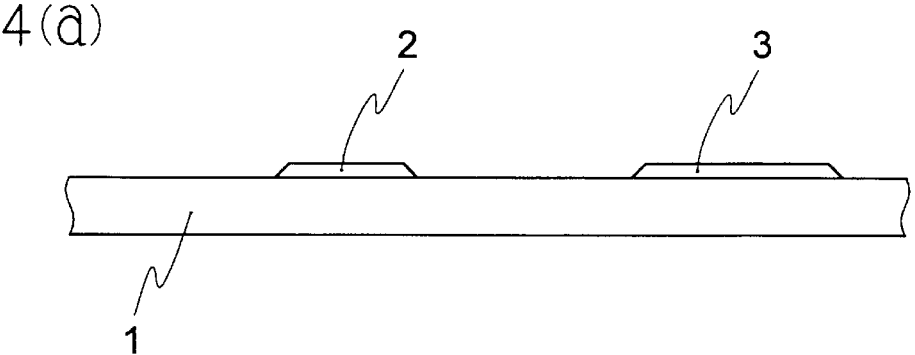
Figure 4B:
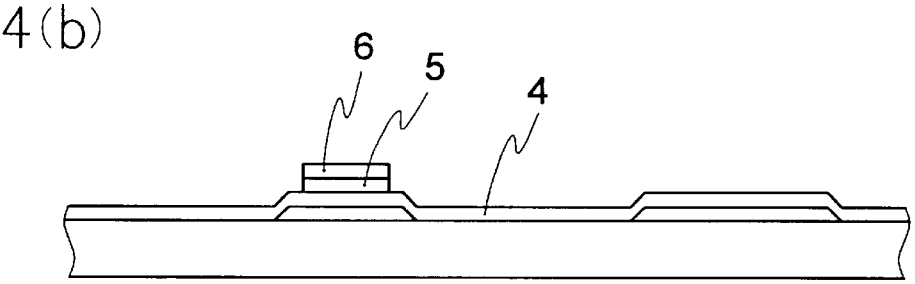
Figure 4C:
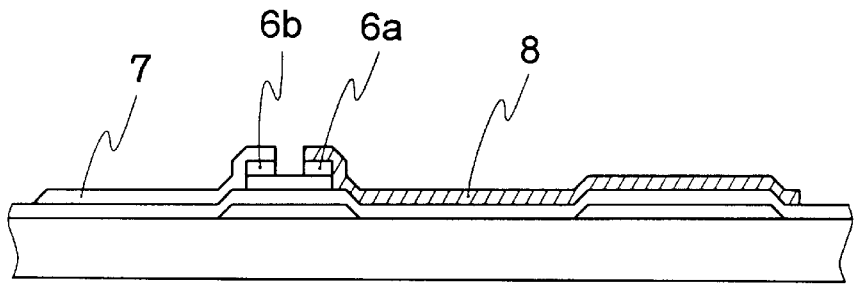
Figure 5A:
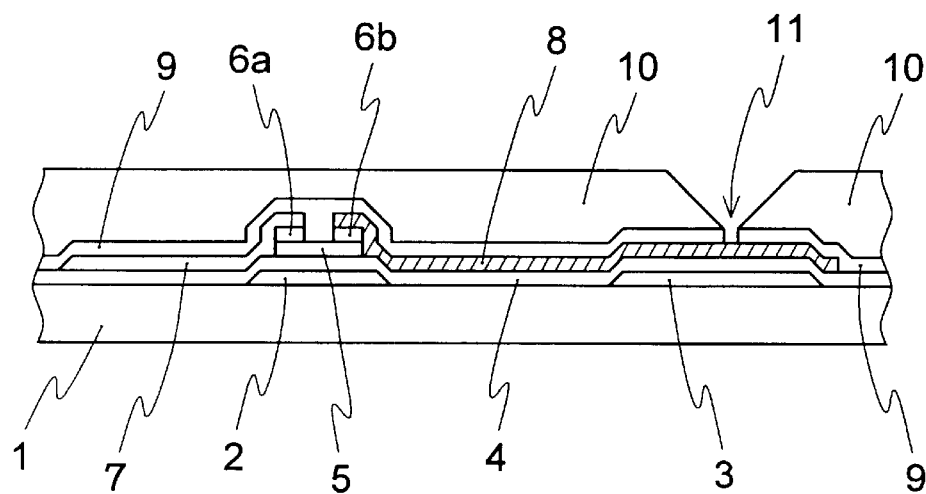
Figure 5B:
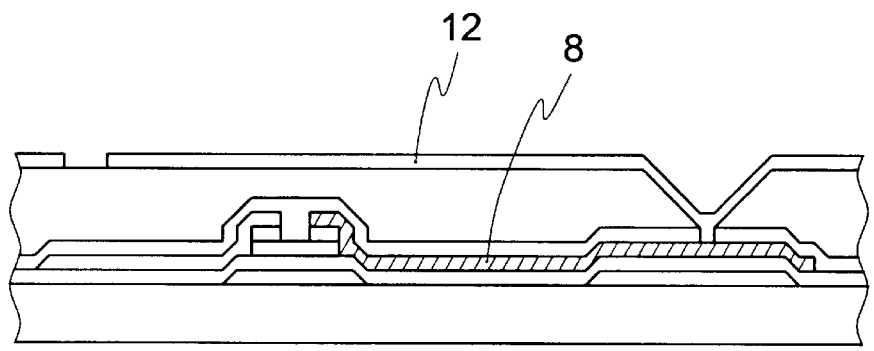
Figure 6:
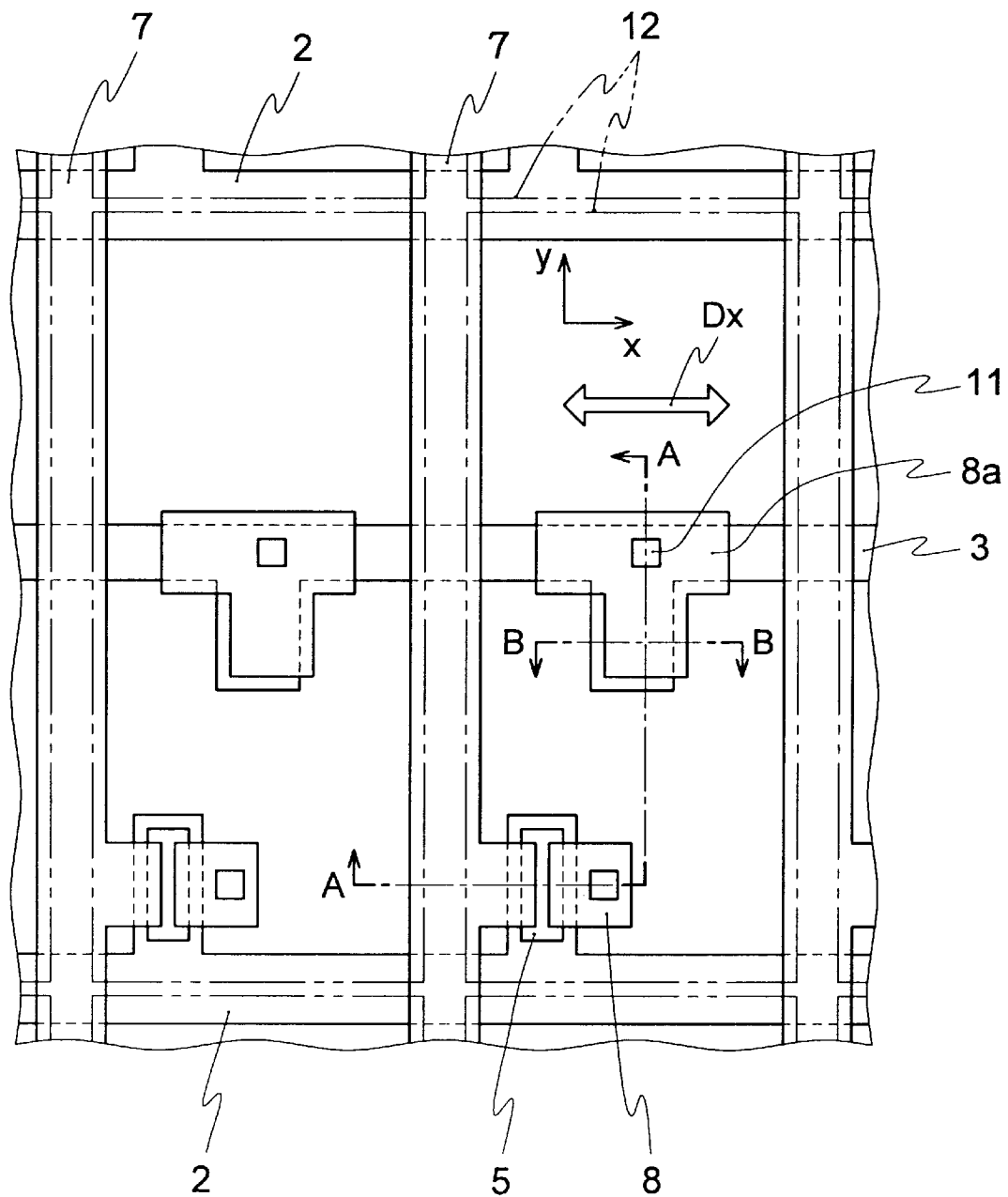
Figure 7:
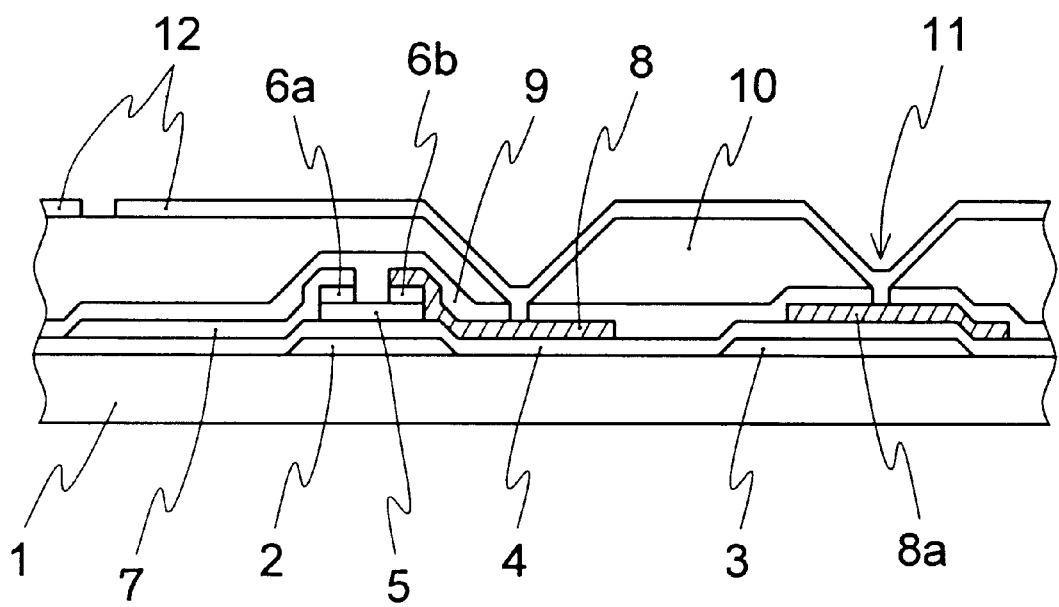
Figure 8:
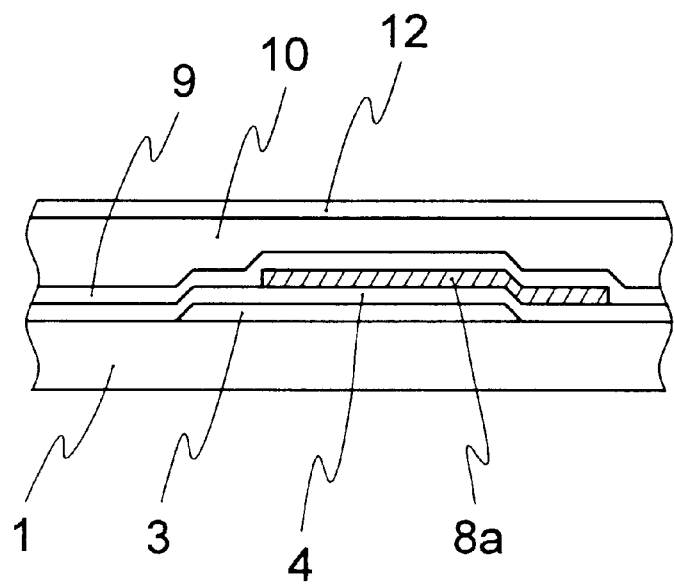
Figure 9:
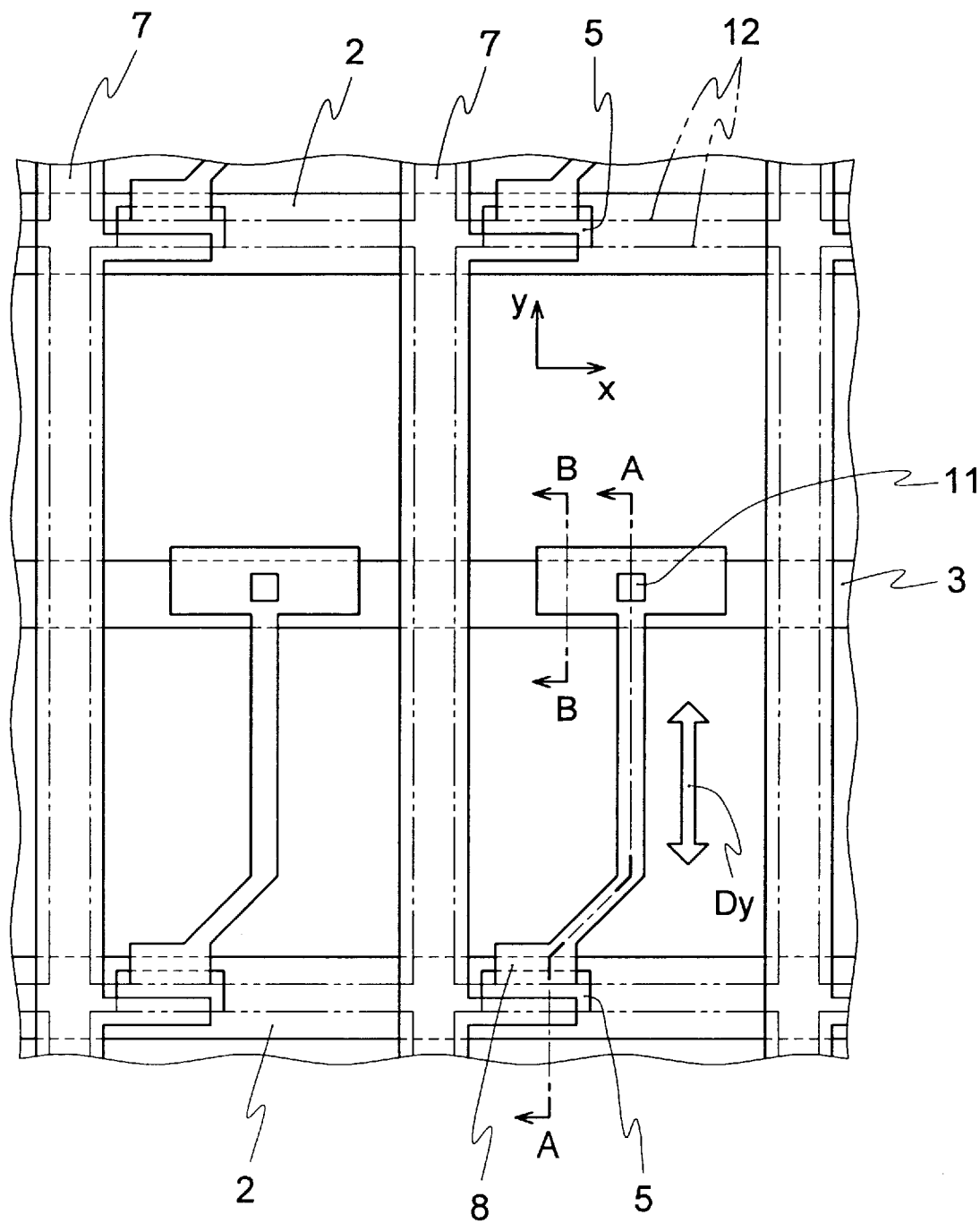
Figure 10:
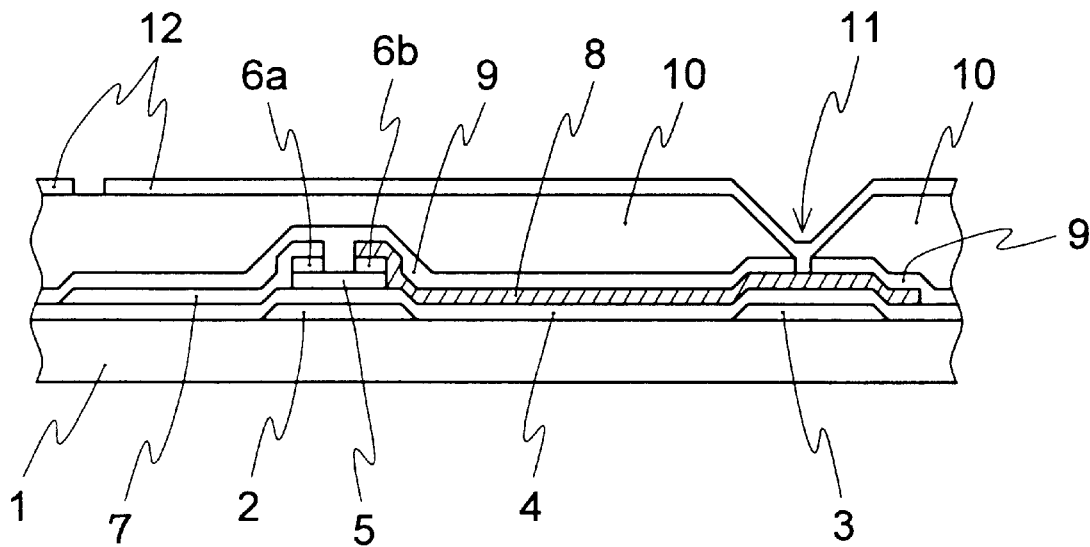
Figure 11:
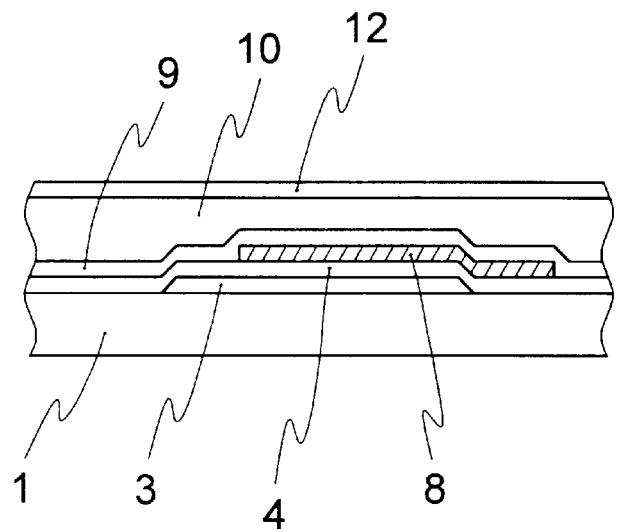
Figure 12:
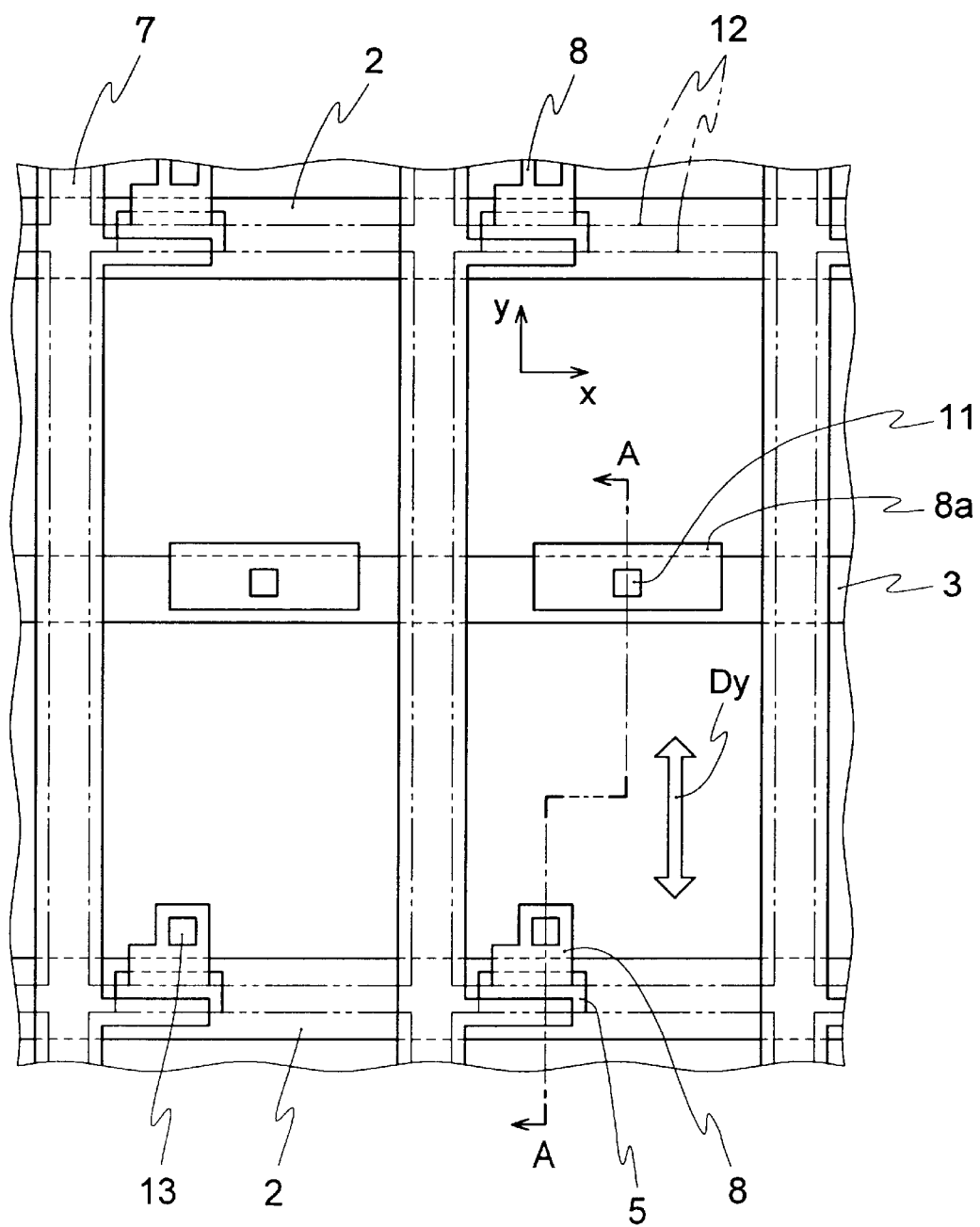
Figure 13:
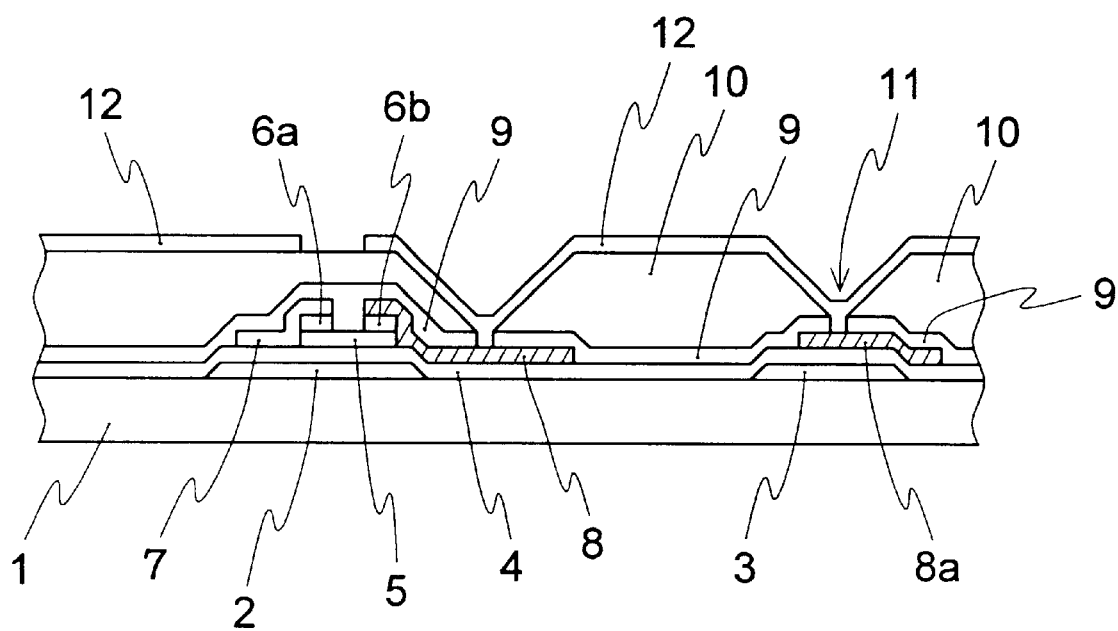
Figure 14:
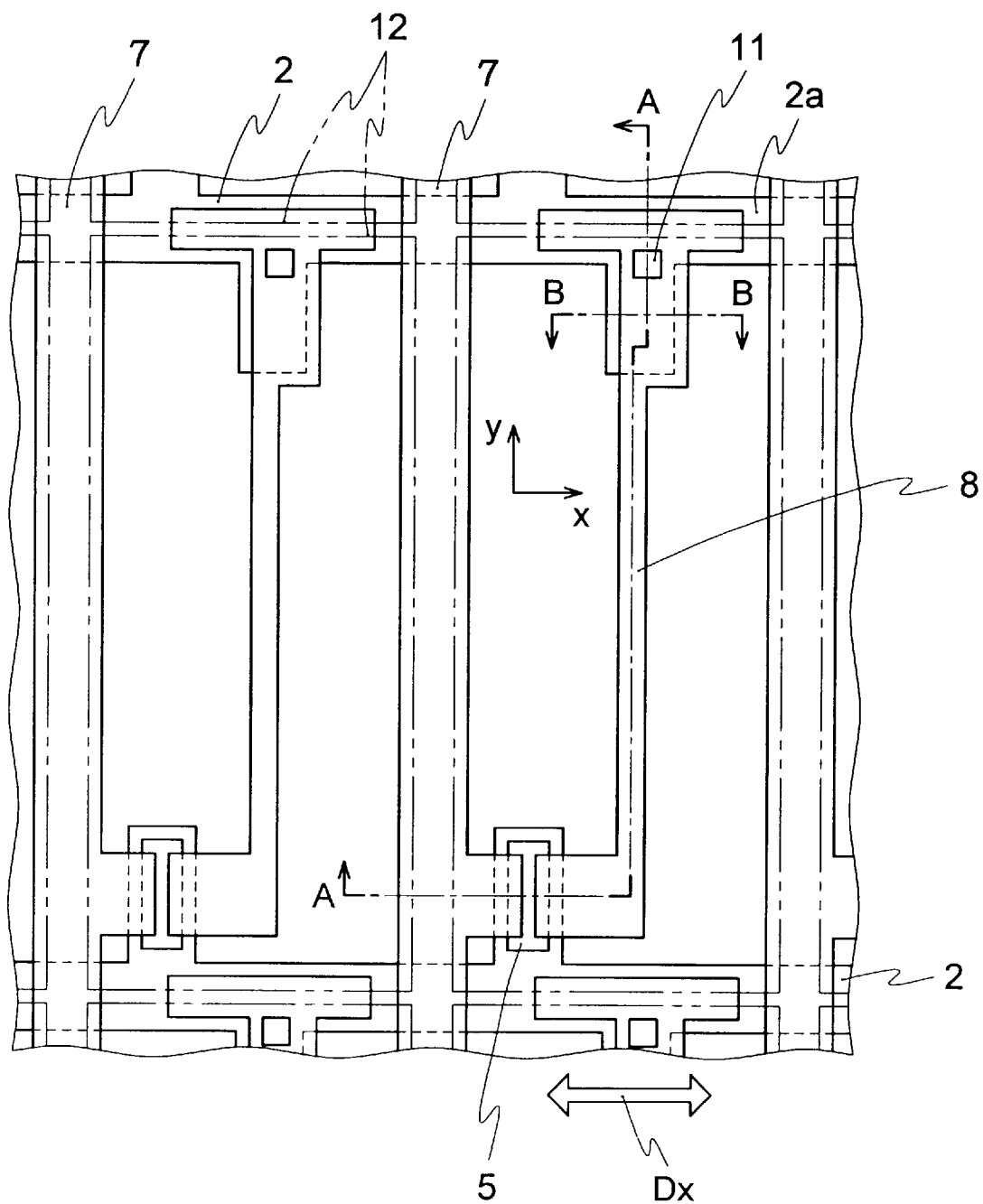
Figure 15:
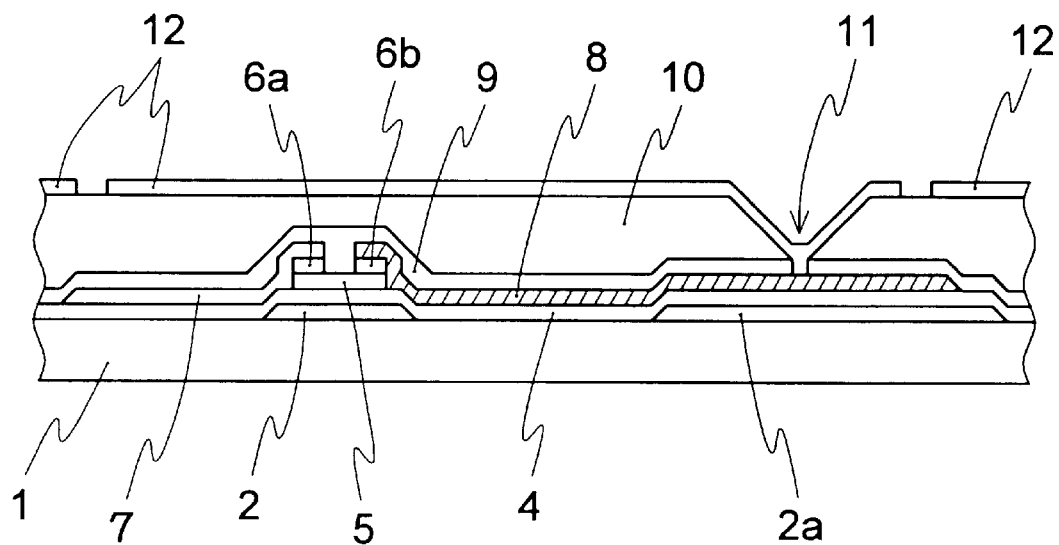
Figure 16:
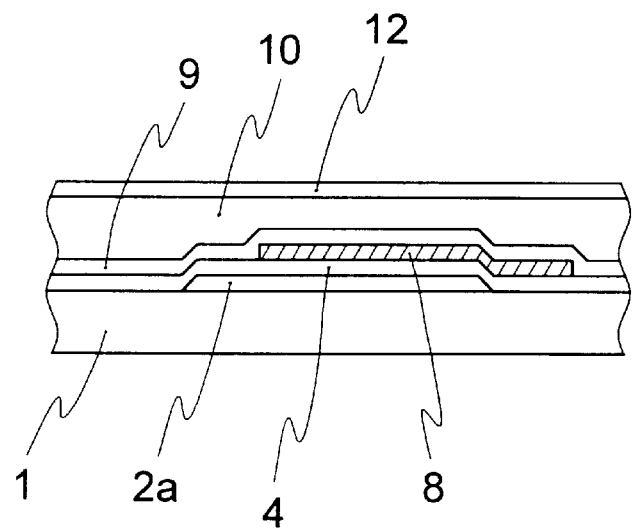
Figure 17:
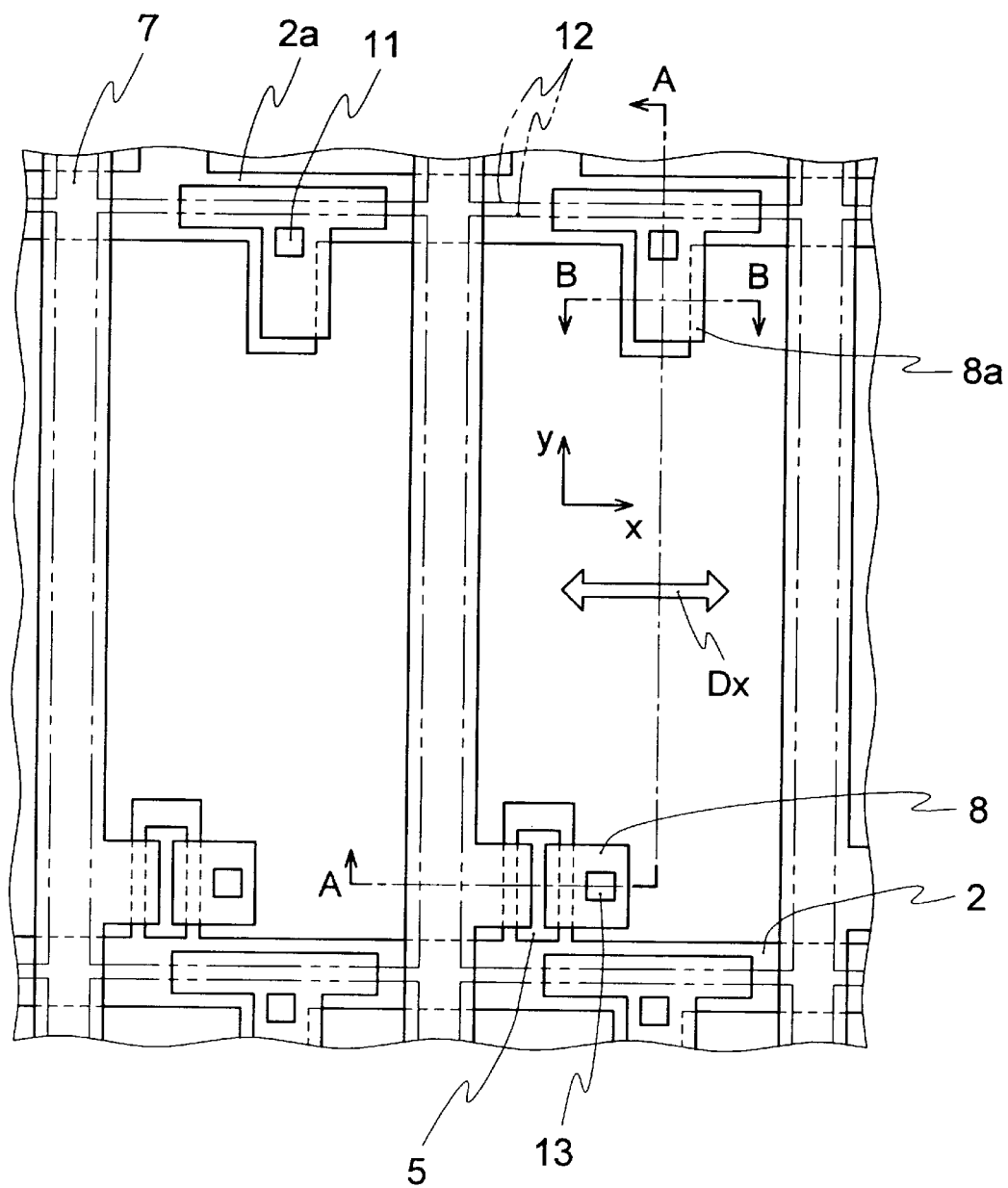
Figure 18:
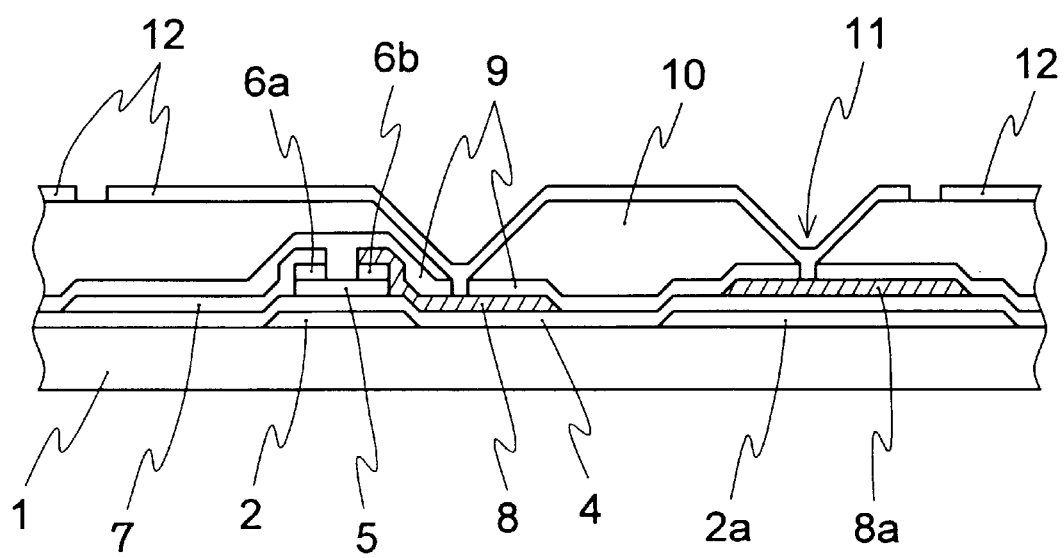
Figure 19:
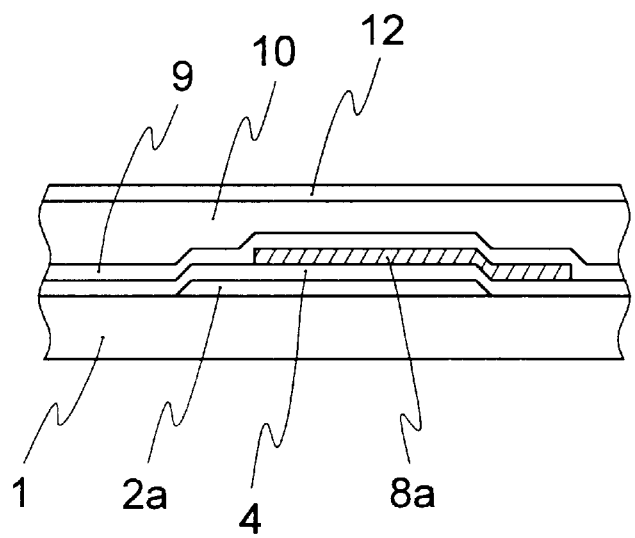
Figure 20:
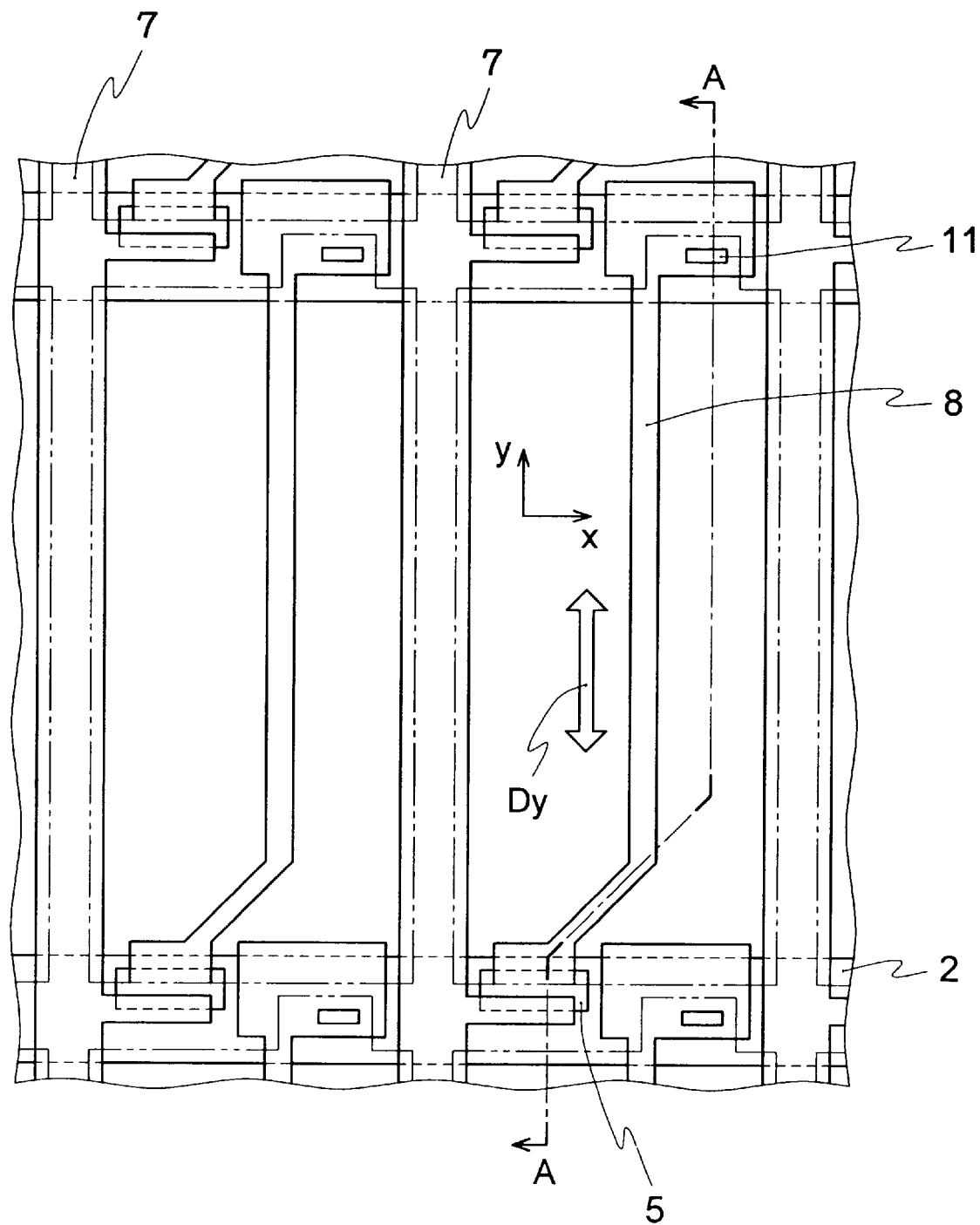
Figure 21:
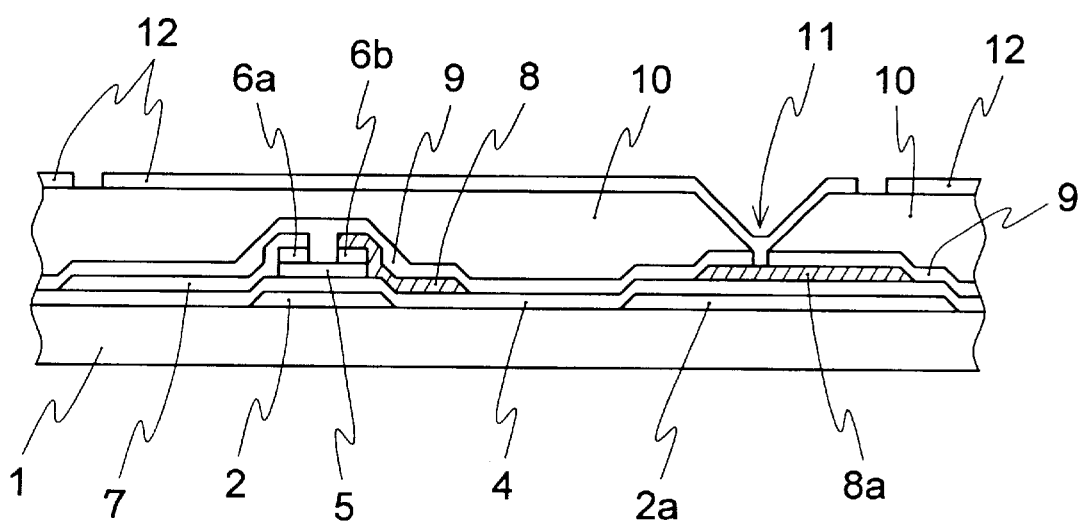
Figure 22:
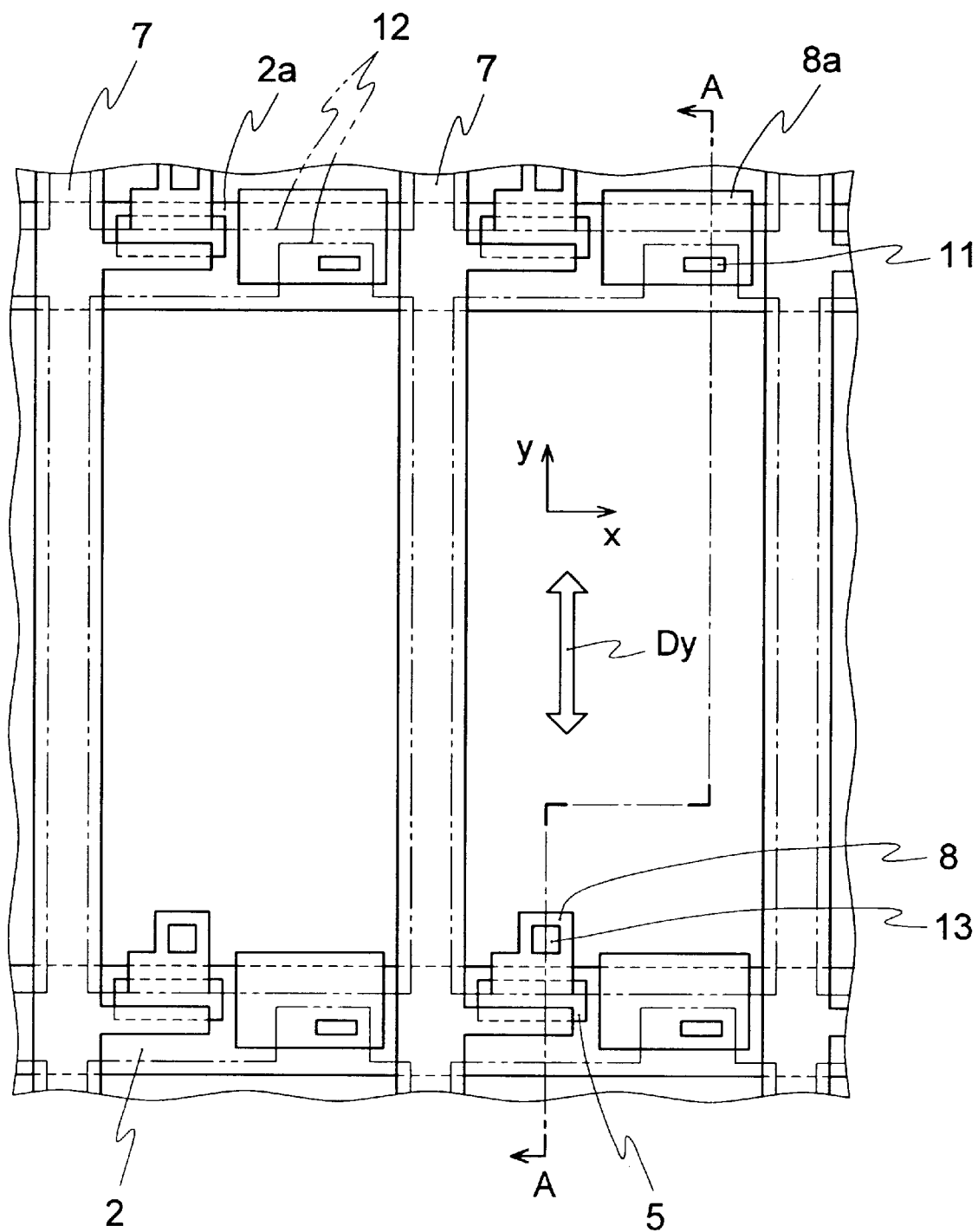
Figure 23:
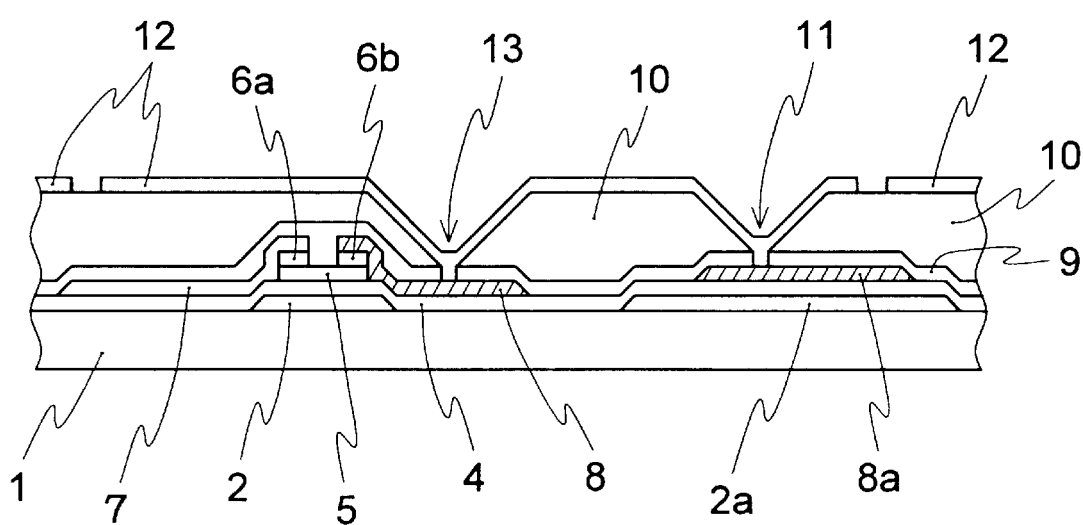
Figure 24:
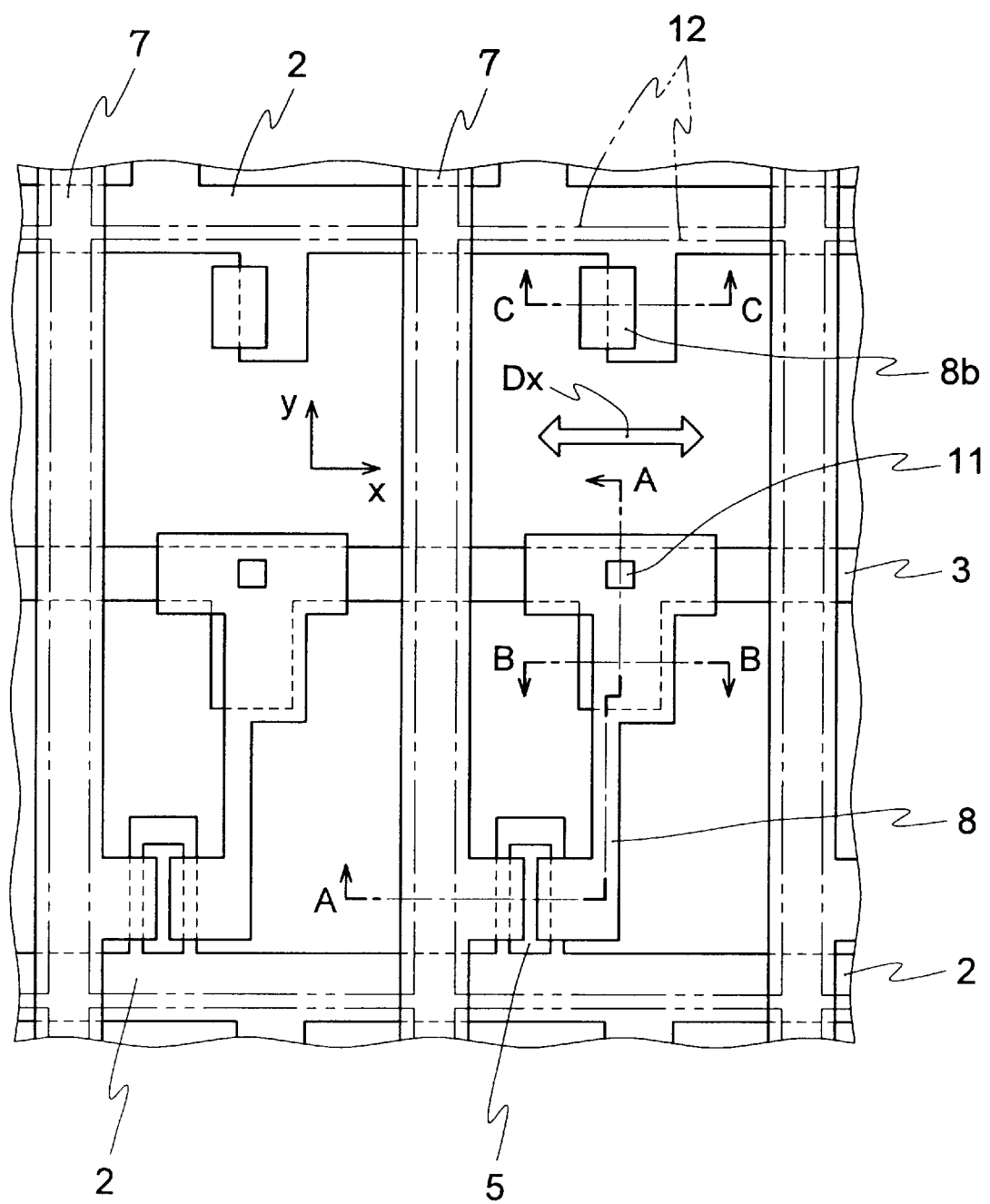
Figure 25:
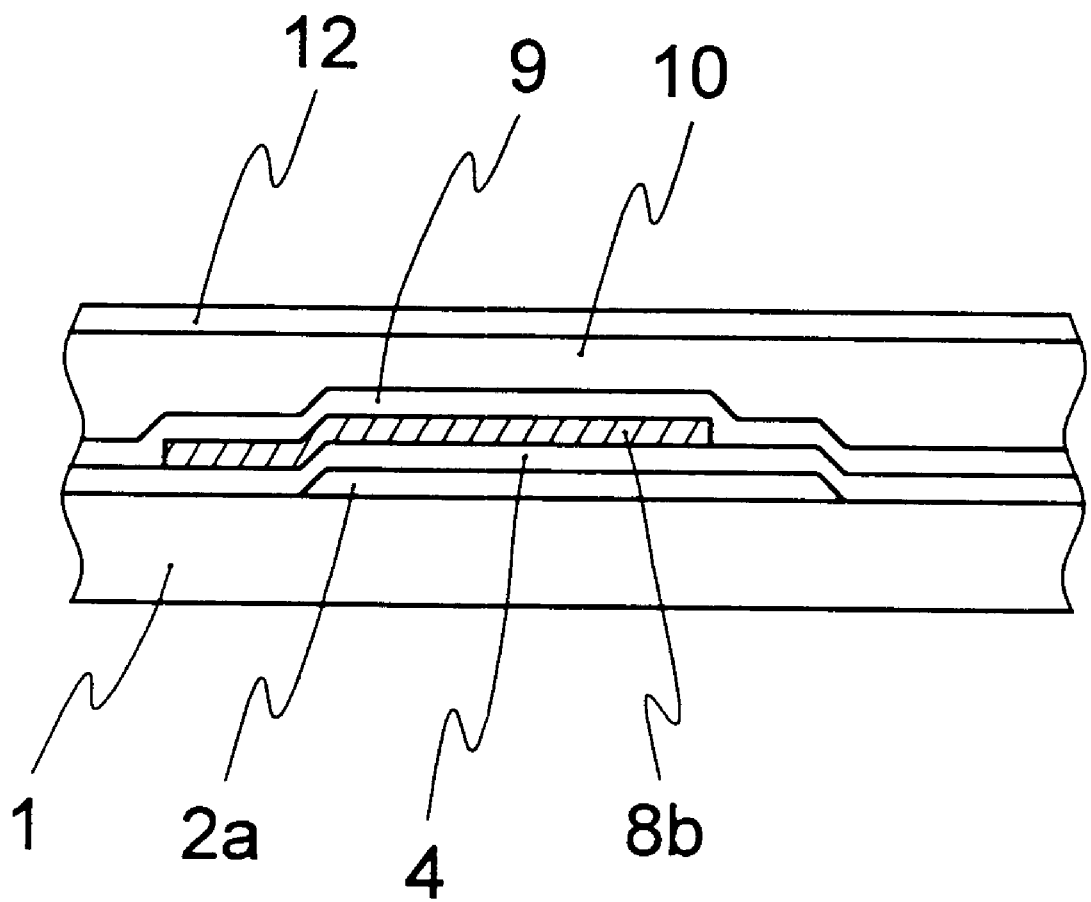
Figure 26:
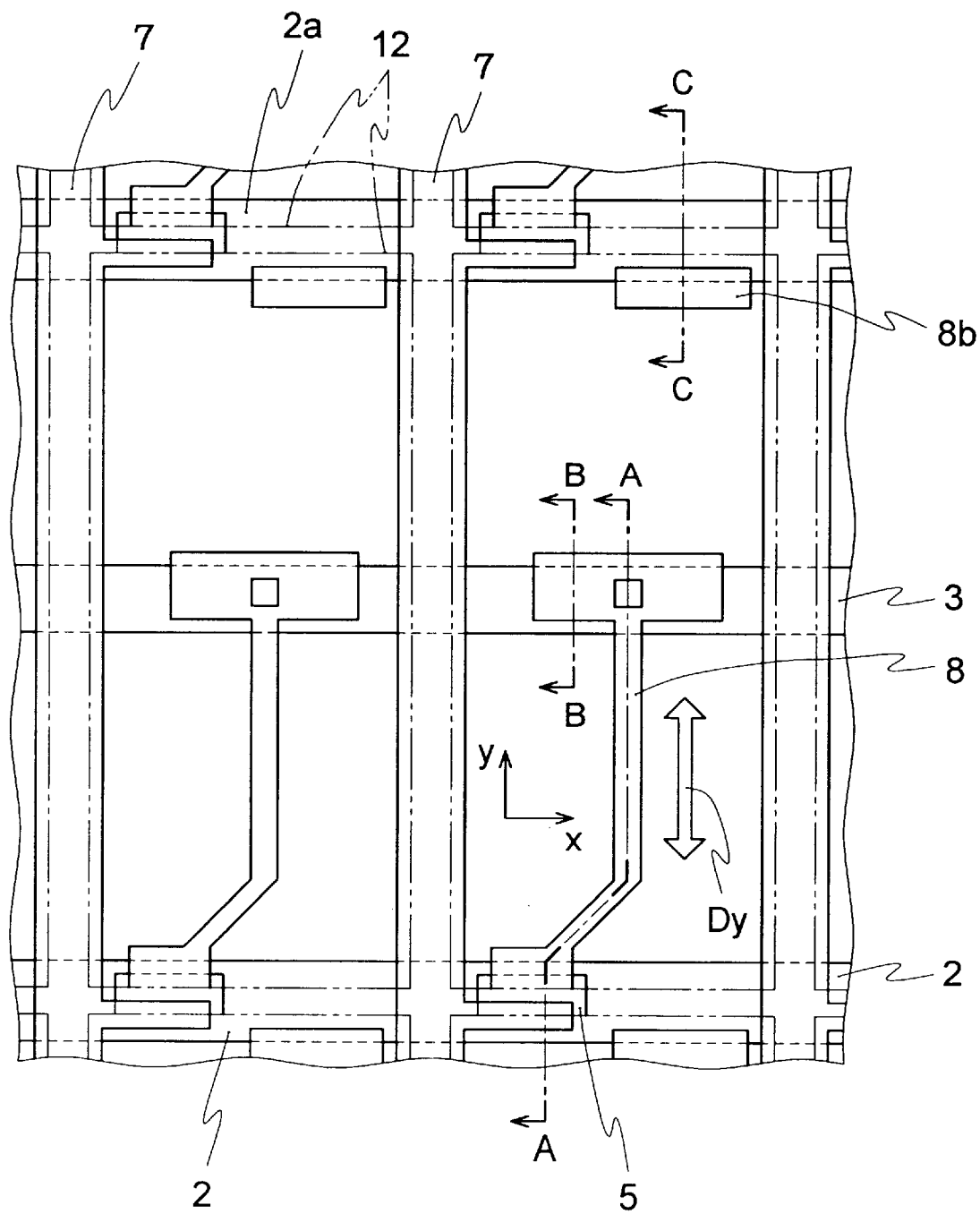
Figure 27:
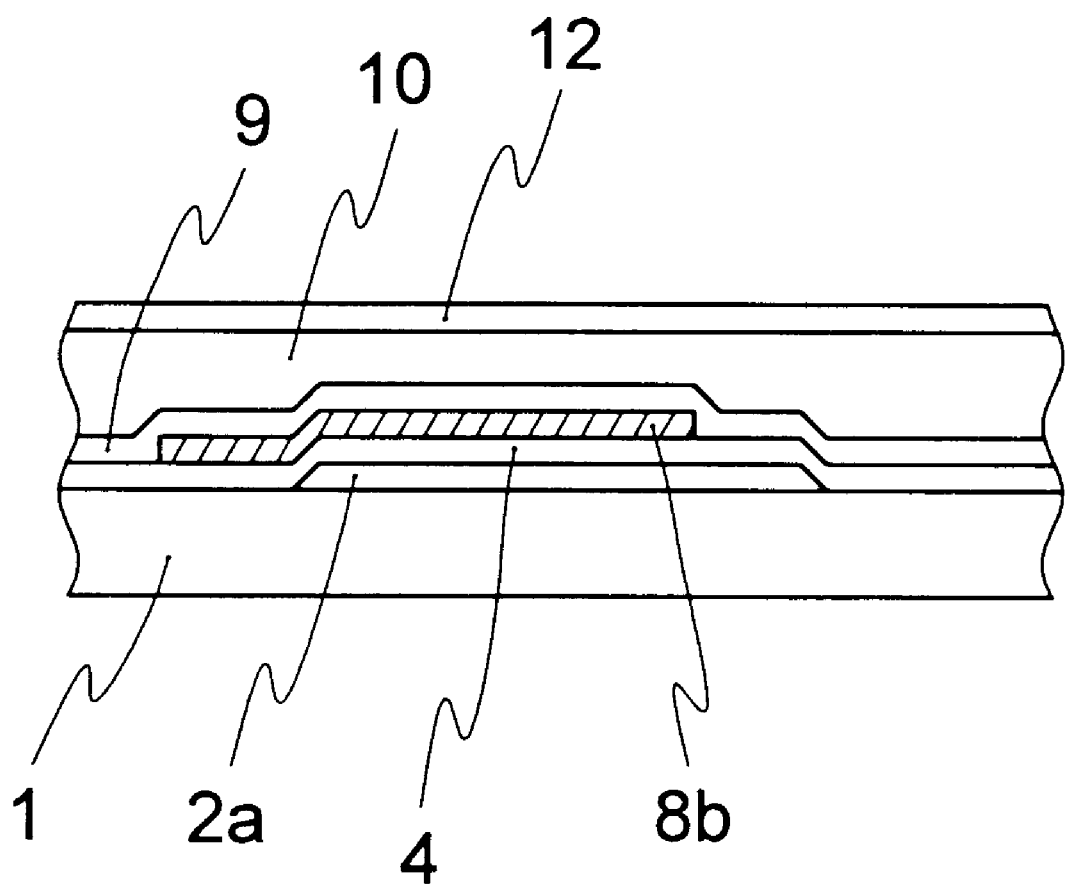
Figure 28A:
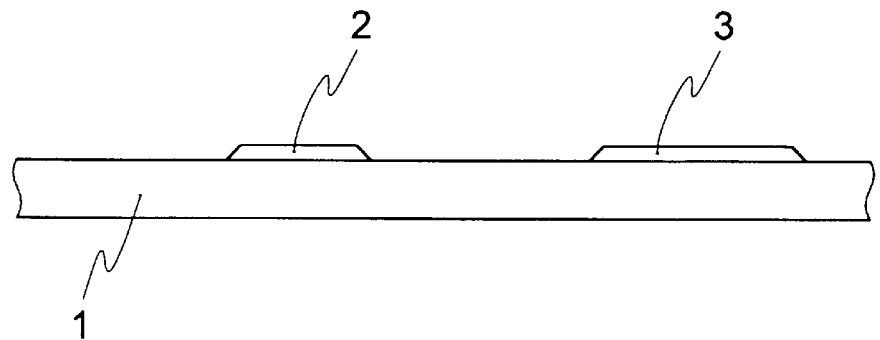
Figure 28B:
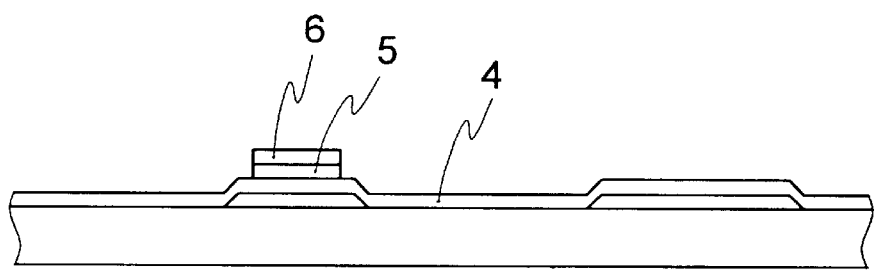
Figure 28C:
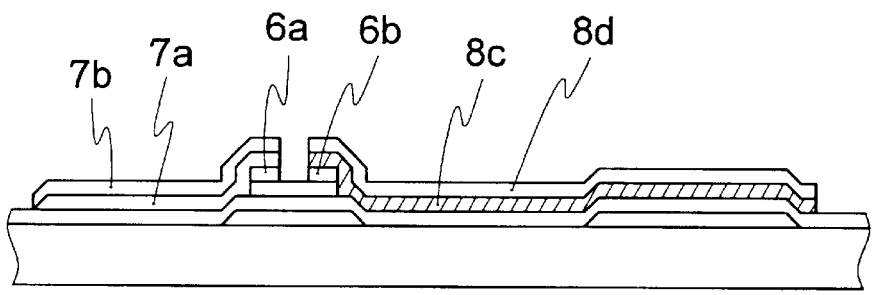
Figure 29A:
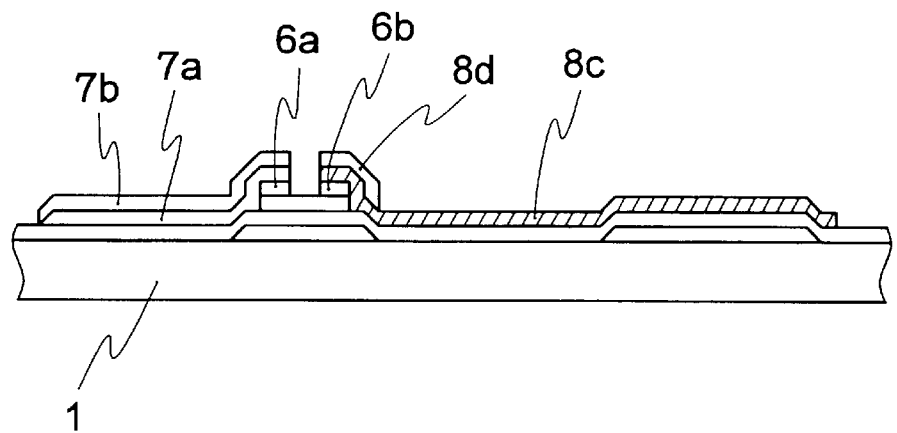
Figure 29B:
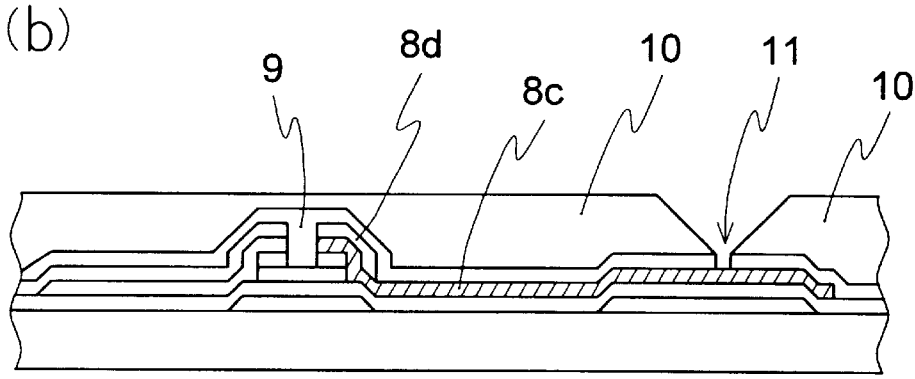
Figure 29C:
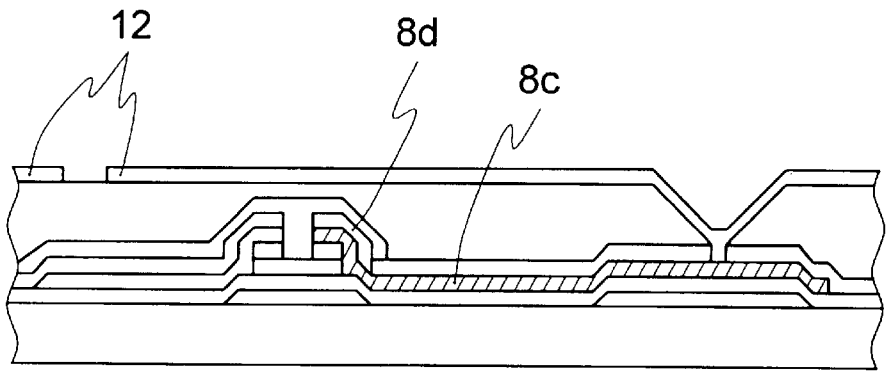
Figure 30:
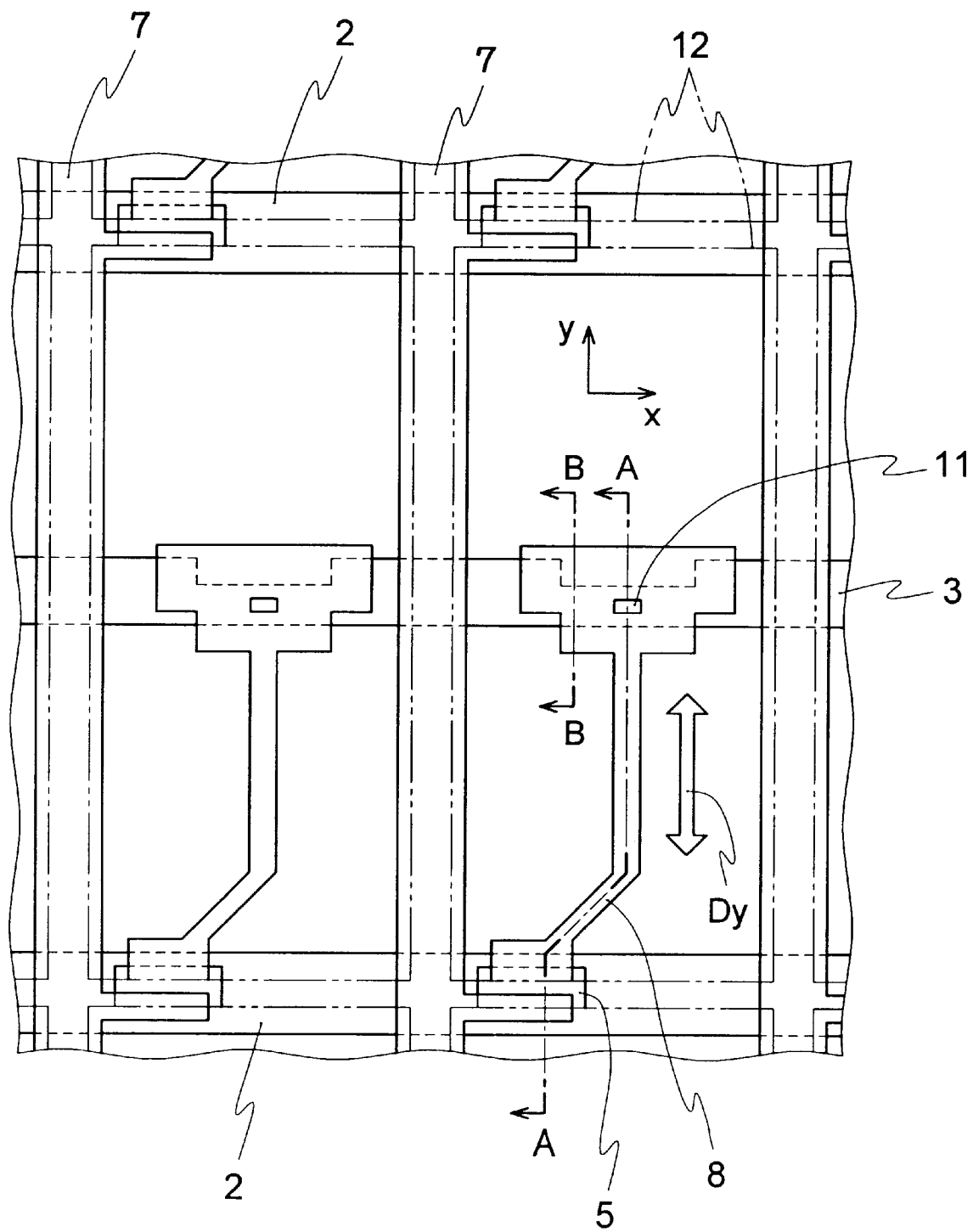
Figure 31:
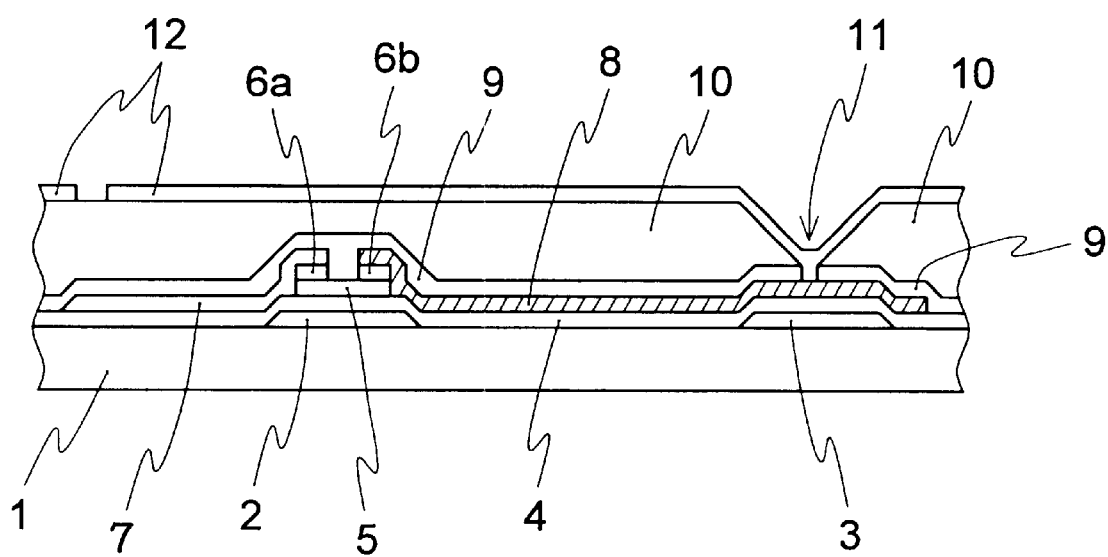
Figure 32:
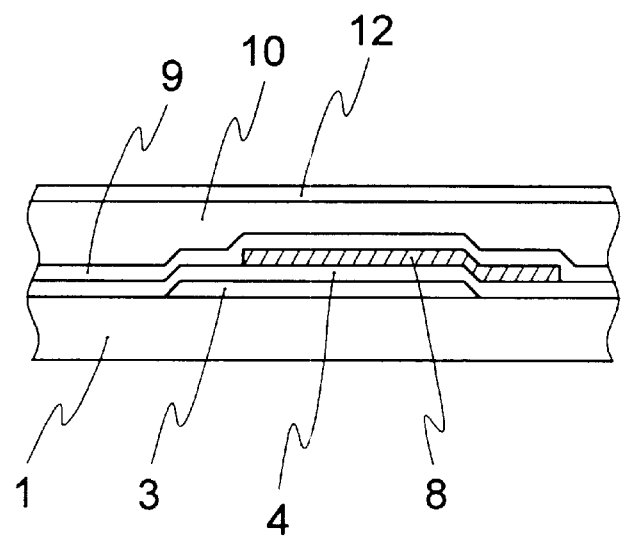
Figure 33:
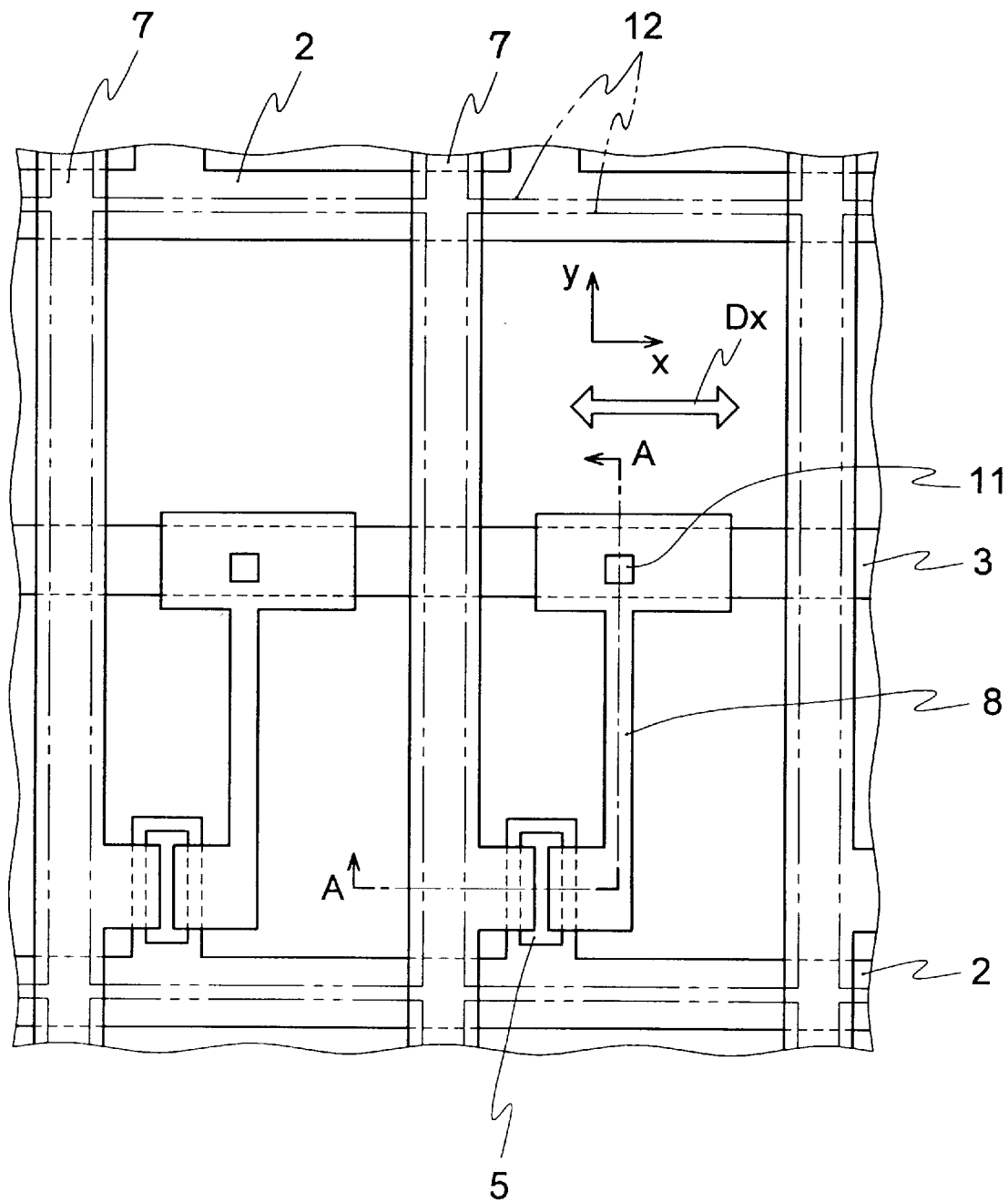
Figure 34:
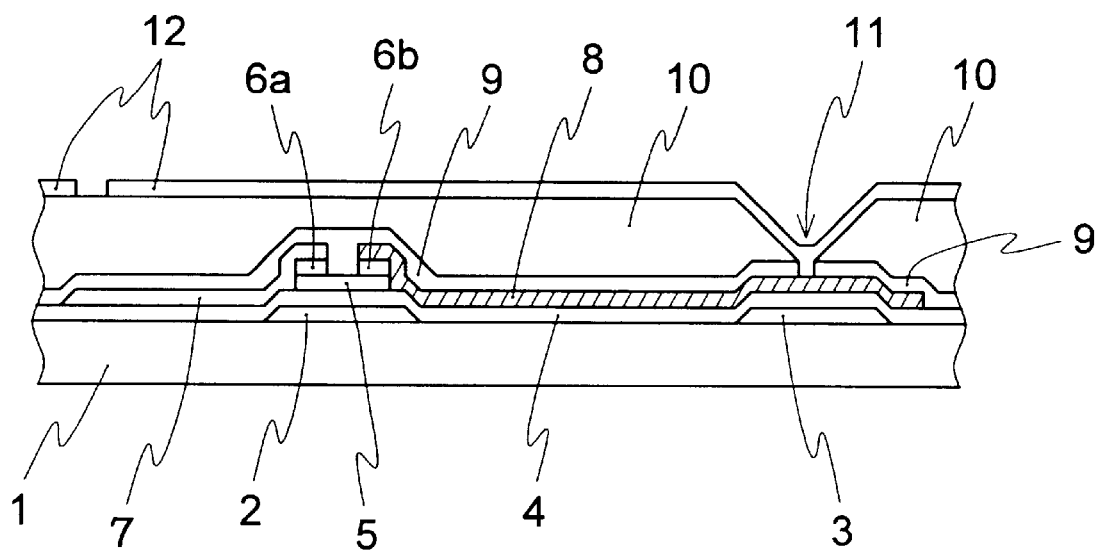
Figure 35:
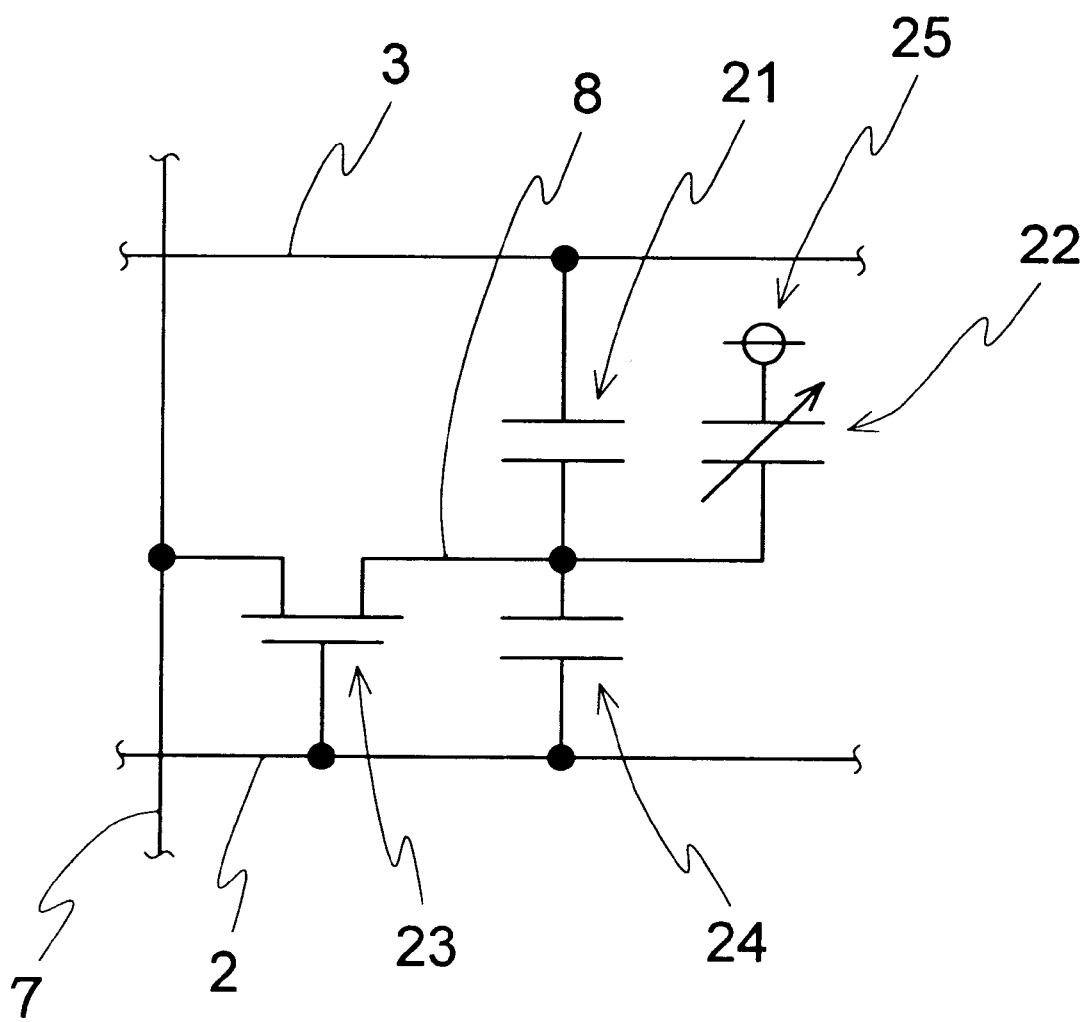

FIGS. 4(a), 4(b) and 4(c) are cross sectional vies, each showing a flow for manufacturing an array substrate of the liquid crystal displaying apparatus of EMBODIMENT 1 of the present invention;

FIGS. 5(a) and 5(b) are cross sectional vies, each showing a flow for manufacturing a liquid crystal displaying apparatus of EMBODIMENT 1 of the present invention;

FIG. 6 is a plan view showing a pixel of EMBODIMENT 2 of the present invention;

FIG. 7 is a cross sectional view showing a pixel of EMBODIMENT 2 of the present invention;

FIG. 8 is a cross sectional view showing a pixel of EMBODIMENT 2 of the present invention;

FIG. 9 is a plan view showing a pixel of EMBODIMENT 3 of the present invention;

FIG. 10 is a cross sectional view showing a pixel of EMBODIMENT 3 of the present invention;

FIG. 11 is a cross sectional view showing a pixel of EMBODIMENT 3 of the present invention;

FIG. 12 is a plan view showing a pixel of EMBODIMENT 4 of the present invention;

FIG. 13 is a cross sectional view showing a pixel of EMBODIMENT 4 of the present invention;

FIG. 14 is a plan view showing a pixel of EMBODIMENT 5 of the present invention;

FIG. 15 is a cross sectional view showing a pixel of EMBODIMENT 5 of the present invention;

FIG. 16 is a cross sectional view showing a pixel of EMBODIMENT 5 of the present invention;

FIG. 17 is a plan view showing a pixel of EMBODIMENT 6 of the present invention;

FIG. 18 is a cross sectional view showing a pixel of EMBODIMENT 6 of the present invention;

FIG. 19 is a cross sectional view showing a pixel EMBODIMENT 6 of the present invention;

FIG. 20 is a plan view showing a pixel of EMBODIMENT 7 of the present invention;

FIG. 21 is a cross sectional view showing a pixel of EMBODIMENT 7 of the present invention;

FIG. 22 is a plan view showing a pixel of EMBODIMENT 8 of the present invention;

FIG. 23 is a cross sectional view showing a pixel of EMBODIMENT 8 of the present invention;

FIG. 24 is a plan view showing a pixel of EMBODIMENT 9 of the present invention;

FIG. 25 is a cross sectional view showing a pixel of EMBODIMENT 9 of the present invention;

FIG. 26 is a plan view showing a pixel of EMBODIMENT 10 of the present invention;

FIG. 27 is a cross sectional view showing a pixel of EMBODIMENT 10 of the present invention;

FIGS. 28(a), 28(b) and 28(c) are cross sectional views, each showing a flow for manufacturing an array substrate of a liquid crystal displaying apparatus of EMBODIMENT 11 of the present invention;

FIGS. 29(a), 29(b) and 29(c) are cross sectional views, each showing a flow for manufacturing an array substrate of a liquid crystal displaying apparatus of EMBODIMENT 11 of the present invention;

FIG. 30 is a plan view showing a pixel of EMBODIMENT 12 of the present invention;

FIG. 31 is a cross sectional view showing a pixel of EMBODIMENT 12 of the present invention;

FIG. 32 is a cross sectional view showing a pixel of EMBODIMENT 12 of the present invention;

FIG. 33 is a plan view showing an array substrate of conventional liquid crystal displaying apparatus;

FIG. 34 is a cross sectional view showing an array substrate of conventional liquid crystal displaying apparatus; and FIG. 35 is an explanatory view showing an equivalent circuit of a pixel of the conventional liquid crystal displaying apparatus.

DETAILED DESCRIPTION OF THE INVENTION

The embodiments of the present invention will be described further referring to the accompanying drawings.

EMBODIMENT 1

Figure 1:
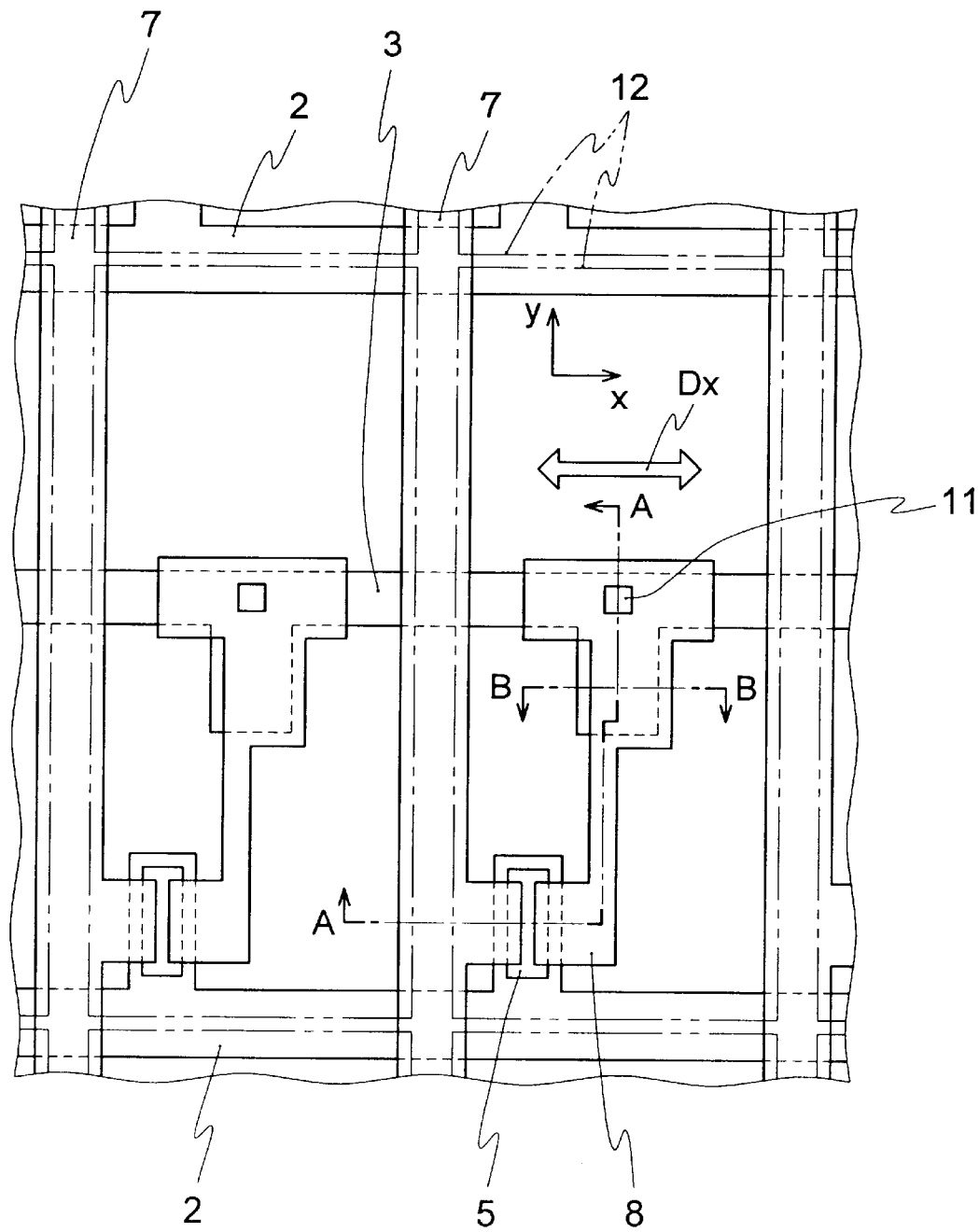
FIG. 1 is a plan view showing a pixel of EMBODIMENT 1 of the present invention.
Figure 2:
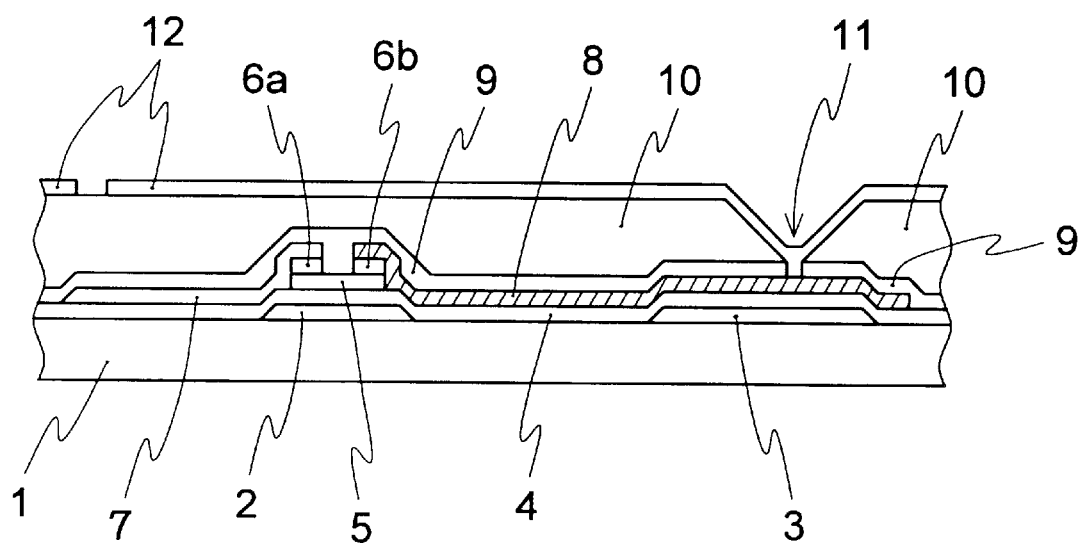
FIG. 2 is a cross sectional view showing a pixel of EMBODIMENT 1 of the present invention.
Figure 3:
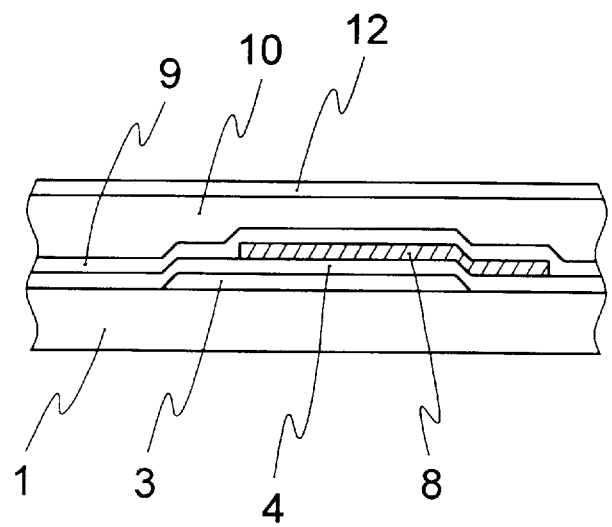
FIG. 3 is a cross sectional view showing a pixel of EMBODIMENT 1 of the present invention.

FIG. 1 is a plan illustrating one view of one portion of a pixel in EMBODIMENT 1 of the present invention. FIG. 2 is a sectional illustrating view taken along a line A—A of FIG. 1. FIG. 3 is a sectional illustrating view taken along a line of B—B of FIG. 1. FIGS. 4(a) to 4(c) and 5(a) to 5(b) are sectional illustrating views each showing a manufacturing process of the array substrate of the liquid crystal displaying apparatus of EMBODIMENT 1 of the present invention. Referring now to FIGS. 1 through 3, the same reference numerals are respectively given to the same elements as those shown in FIGS. 31 through 33. In the pixels of EMBODIMENT 1, the Cgd changes when the drain electrode 8 is relatively deviated to the x axial direction Dx to the scanning wiring 2. When the drain electrode 8 is deviated in the −x direction to the scanning wiring 2, the superposing area between the drain electrode 8 and the scanning wiring 2 increases to increase the Cgd. At this time, in the B—B line, the superposing area between the drain electrode 8 and the Cs wiring 3 increases to increase the storage capacitance Cs value. On the contrary, the superposing area between the drain electrode 8 and the scanning wiring 2 decreases to decrease the storage capacitance Cgd when the drain electrode 8 is deviated to the +x direction relatively to the scanning wiring 2. At this time, in the B—B line, the superposing area between the drain electrode 8 and the Cs wiring 3 decreases to decrease the retaining capacitance Cs value decreases. By designing the shape of the drain electrode and the Cs wiring with the B—B line so that the (1) equation may become constant, a liquid crystal displaying apparatus where the flickering, the image sticking and so on are not caused is provided even if the relative position between the drain electrode 8 and the scanning wiring 2 is different in the exposing region.

A manufacturing method of an array substrate of the liquid crystal displaying apparatus of EMBODIMENT 1 will be described in accordance with FIG. 4. The scanning wiring 2 and the Cs wiring 3 are formed by, for example, Cr (FIG. 4(a)) on the transparent insulating substrate 1. For example, SiN as a gate insulating film 4, for example, amorphous Si (hereinafter referred to as a–Si) as a semiconductor layer 5 which becomes a channel, for example, n+a–Si with P ion being doped in it as semiconductor layer 6 with impurities ion for forming a signal wiring metal and an ohmic contact being doped in them are filmed continuously, to remove the n+a–Si and a–Si except for a portion which becomes TFT (FIG. 4(b)). For example, Cr as signal wiring 7, for example, Cr as drain electrode 8 are formed at the same time. By removing the unnecessary n+a–Si, a source region 6a for obtaining the signal wiring and ohmic contact, and a drain region 6b for obtaining the drain electrode and ohmic contact are formed (FIG. 4(c)). For example, the SiN is filmed as a passivation film 9 for protecting a channel portion where the n+−a–Si is removed. After coating with a spin coating method, for example, acrylic resin as the transparent insulating film 10, a contact hole 11 necessary for connection with a pixel electrode with the transparent insulating film 10 as resist, and a contact hole of the terminal portion for printing signals on the scanning wiring and the signal wiring are provided. The passivation film 9 is removed (FIG. 5(a)) by dry etching with using, for example, CF4 gas. Finally, for example, ITO is formed (FIG. 5(b)) as the pixel electrode 12 and the array substrate is made.

In EMBODIMENT 1 provided as described, as storage capacitance is formed to compensate for the change of the Cgd for each exposing region, the ΔVgd value becomes constant even if the exposing region is different, and the displaying quality reduction such as flickering, image sticking and nonuniform displaying can be prevented. Thus, a liquid crystal displaying apparatus can be provided which is high in displaying quality and is easy to manufacture and high in yield.

EMBODIMENT 2

FIG. 6 is a plan view of one portion of the pixel of EMBODIMENT 2 of the present invention. FIG. 7 is a sectional illustrating view taken along a line of A—A of FIG. 6. FIG. 8 is a sectional illustrating view taken along a line of B—B of FIG. 6. In EMBODIMENT 1, the drain electrode 8 is extended so far as a portion for directly forming the storage capacitance. In this embodiment, the drain electrode 8 is separated from an electrode 8a for forming the storage capacitance, and EMBODIMENT 2 is the same as EMBODIMENT 1 in the other respects. The drain electrode 8 and an electrode 8a for forming the storage capacitance are electrically connected through a pixel electrode 12 by a contact hole 13 for electrically connecting the drain electrode 8 and the pixel electrode 12, and a contact hole 11 for electrically connecting the pixel electrode 12 and an electrode 8a for forming the storage capacitance. Even in this configuration, the same effects as those of EMBODIMENT 1 are obtained. In EMBODIMENT 1, the drain electrode 8 is made of an opaque metallic material, and extends within the pixel, whereby the transmission light is shielded. In EMBODIMENT 2, because of the absence of this portion, the quantity of the transmitting light increases as compared with EMBODIMENT 1 to have higher aperture ratio, and the illuminance of the back light can be reduced, with an effect that lower electric consumption can be provided.

EMBODIMENT 3

FIG. 9 is a plan illustration view of one portion of the pixel of EMBODIMENT 3 of the present invention. FIG. 10 is a section al illustrating view taken along a line A—A of FIG. 9. FIG. 11 is a sectional illustrating view taken along a line of B—B of FIG. 9. In EMBODIMENT 1, the TFT connects with the scanning wiring 2 by an electrode and is formed on it. In EMBODIMENT 3, the TFT is formed on the scanning wiring 2, and in other respects, EMBODIMENT 3 is the same as EMBODIMENT 1. In EMBODIMENT 3, in the Cgd, the drain electrode 8 is deviated to an arrow direction of FIG. 9, namely, in FIG. 9, to the axial direction in position, whereby the value is changed. It is necessary to change a direction of changing the storage capacitance Cs value to the y axial direction. In EMBODIMENT 3, when the drain electrode 8 is relatively deviated to the—y direction with respect to the scanning wiring 2, the superposing area between the drain electrode 8 and the scanning wiring 2 increases to increase the Cgd. At this time, in the B—B line, the superposing area between the drain electrode 8 and the Cs wiring increases and the storage capacitance Cs value also increases. When the drain electrode 8 is relatively deviated to the +y direction with respect to the scanning wiring 2, the superposing area between the drain electrode 8 and the scanning wiring 2 is reduced to reduce the Cgd. At this time, in the B—B line, the superposing area between the drain electrode 8 and the Cs wiring 3 is reduced to reduce the storage capacitance Cs value. By designing the shape of the drain electrode in the Cs wiring with the B—B line so that the (1) equation may become constant, a liquid crystal displaying apparatus where the flickering, the image sticking and so on are not caused is provided even if the relative position is different in position between the drain electrode 8 and the scanning wiring 2 in the different exposing region.

EMBODIMENT 4

FIG. 12 is a plan illustrating view of one portion of a pixel of EMBODIMENT 4 of the present invention. FIG. 13 is a sectional illustrating view taken along a line of A—A of FIG. 12. In EMBODIMENT 3, the drain electrode 8 is extended so far as a portion for directly forming the storage capacitance. In this embodiment, the drain electrode 8 is separated from an electrode 8a for forming the storage capacitance, and EMBODIMENT 4 is the same as EMBODIMENT 3 in the other respects. The drain electrode 8 and an electrode 8a for forming the storage capacitance are electrically connected through a pixel electrode 12 by a contact hole 13 for electrically connecting the drain electrode with the pixel electrode 12, and a contact hole 11 for electrically connecting the pixel electrode 12 with an electrode 8a for forming the storage capacitance. Even in this configuration, the same effects are obtained as those of EMBODIMENT 3. The drain electrode 8 is made of an opaque metallic material, and extends within the pixel, whereby the transmission light is shielded. In EMBODIMENT 4, because of the absence of this portion, the quantity of the transmitting light increases as compared with EMBODIMENT 3 to have higher aperture ratio, and the illuminance of the back light can be reduced, with an effect that the lower electric consumption can be provided.

EMBODIMENT 5

EMBODIMENTS 1 through 4 show an example where the Cs wiring 3 for forming the storage capacitance is formed of another wiring at the same time by the same pattern forming process as that of the scanning wiring 2, and an example where the storage capacitance Cs is formed on the previous scanning line.

FIG. 14 is a plan illustrating view of one portion of a pixel of EMBODIMENT 5 of the present invention. FIG. 15 is a sectional illustrating view taken along a line of A—A of FIG. 14. FIG. 16 is a sectional illustrating view taken along a line of B—B of FIG. 14. In this embodiment, the Cs wiring 3 is not formed, and the storage capacitance is formed on the scanning wiring 2a of the former stage, with EMBODIMENT 5 being the same as EMBODIMENT 1 in the other respects. As the manufacturing process is the same as that of EMBODIMENT 1, the illustration is omitted. Even in such configuration, the same effect as that of EMBODIMENT 1 can be obtained.

EMBODIMENT 6

FIG. 17 is a plan illustrating view of one portion of a pixel of EMBODIMENT 6 of the present invention. FIG. 18 is a sectional illustrating view taken long a line of A—A of FIG. 16. FIG. 19 is a sectional illustrating view taken along a line of B—B of FIG. 17. As the manufacturing process is the same as that of EMBODIMENT 1, the description is omitted. In EMBODIMENT 5, the drain electrode 8 is extended so far as a portion for directly forming the storage capacitance. In this embodiment, the drain electrode 8 is separated from an electrode 8a for forming the storage capacitance, and EMBODIMENT 6 is the same as that of EMBODIMENT 5 in the other respects. Even in this configuration, the same effects are obtained as those of EMBODIMENT 1. In EMBODIMENT 5, as in EMBODIMENT 2, the drain electrode 8 is made of an opaque metallic material, and extends within the pixel, whereby the transmission light is shielding. In EMBODIMENT 6, because of the absence of this portion, the quantity of the transmitting light increases as compared with that of EMBODIMENT 5 to have a higher aperture ratio, and the illuminance of the back light can be reduced, with an effect that lower electric consumption can be provided.

EMBODIMENT 7

FIG. 20 is a plan illustration view of one portion of a pixel of this EMBODIMENT 7 of the present invention. FIG. 21 is a sectional illustrating view taken along a line A—A of FIG. 20. In this embodiment, the TFT is formed on the scanning line and the Cs wiring 3 is not formed. The storage capacitance is formed on the scanning wiring 2a of the former stage. As the manufacturing process is the same as that of EMBODIMENT 1, the illustration is omitted. Even in such a configuration, the same effect as that of EMBODIMENT 3 can be obtained.

EMBODIMENT 8

FIG. 22 is a plan illustrating view of one portion of a pixel of EMBODIMENT 8 of the present invention. FIG. 23 is a sectional illustrating view taken along a line A—A of FIG. 22. In EMBODIMENT 7, the drain electrode 8 is extended so far as a portion for directly forming the storage capacitance. In this embodiment, the drain electrode 8 is separated from an electrode 8a for forming the storage capacitance, and EMBODIMENT 8 is the same as that of EMBODIMENT 7 in the other respects. As the manufacturing process is the same as EMBODIMENT 1, the description is omitted. Even in this configuration, the same effects are obtained as those of EMBODIMENT 1. In EMBODIMENT 7, in EMBODIMENT as, the drain electrode 8 is made of an opaque metallic material, and extends within the pixel, whereby the transmission light is shielded. In EMBODIMENT 8, because of the absence of this portion, the quantity of the transmitting light increases as compared with EMBODIMENT 7 to have a higher aperture ratio, and the illuminance of the back light can be reduced, with an effect that lower electric consumption can be provided.

EMBODIMENT 9

In the aforementioned EMBODIMENTS 1 through 8, the opaque metallic film is used as a drain electrode 8. The opaque metallic film is used as the scanning wiring 2 and Cs wiring 3 are using the opaque metallic film. As the position of the drain electrode 8 changes to change the Cs value, the Cs value is adapted to change by moving the position of the drain electrode 8 and the position of the electrode 8a to be formed in the storage capacitance, whereby the quantity of light which transmits through the pixel changes at the same time. When the quantity of the transmitting light changes in a step shape in the boundary of the exposing region, there is a possibility of being visually recognized as nonuniform displaying. In the aforementioned embodiment, the electrode arrangement within the pixel is fixed so that the quantity of the transmitting light may not be changed if the Cs value is changed for each exposing region.

FIG. 24 is a plan illustrating view of one portion of a pixel of EMBODIMENT 9 of the present invention. FIG. 25 is a sectional illustrating view taken along a line of C—C of FIG. 22. The A—A sectional and the B—B section are the same as that of EMBODIMENT 1. When the drain electrode 8 is deviated in a (-x) direction to the scanning wiring 2 in FIG. 24, the superposing area between the drain electrode 8 and the scanning wiring 2 increases to increase the Cgd. At the same time, the superposing area between the drain electrode 8 and the Cs wiring 3 increases in the B—B line to increase the Cs value, and the (1) equation becomes constant. As, at this time, a portion where the drain electrode 8 is extended from the Cs wiring 3 is superposed on the Cs wiring 3, the area of the shielding portion is reduced and the quantity of the transmitting light is increased. When a light shielding film 8b for compensating the aperture ratio is formed as described in FIG. 25 simultaneously with the formation of the scanning wiring 2a of the former stage and the drain electrode 8, the light shielding film 8b is reduced in the quantity of the transmitting light in this portion, because the portion of being projected from the former stage scanning wing 2a increases. The quantity of the transmitting light is designed to off set in increase and decrease. When the drain electrode 8 is deviated to the +x direction to the scanning wiring 2, the relation between the increase and the decrease becomes reverse to the aforementioned case. Thus, a liquid crystal displaying apparatus is provided which has the same effect as that of EMBODIMENT 1, and does not change in the aperture ratio or quantity of transmitting light. The manufacturing process, which is the same as EMBODIMENT 1, is omitted in the illustration. In EMBODIMENT 9, the drain electrode 8 and the storage capacitance electrode 8a can be separated in construction as shown in EMBODIMENT 2, with the same effect as that of EMBODIMENT 2 being obtained. Although the light shielding film 8b is provided on the scanning wiring 2 of the former stage in EMBODIMENT 9, the light shielding film 8b can be formed with the portion for forming simultaneously with the scanning wiring 2 being provided else. In this manner, the same effect can be provided even in the same configuration as EMBODIMENT 5 as all as EMBODIMENT 5.

EMBODIMENT 10

FIG. 26 is a plan illustrating view of one portion of a pixel of EMBODIMENT 10 of the present invention. FIG. 27 is a sectional illustration view taken along a line C—C of FIG. 26.

EMBODIMENT 10 shows an example which is the same as EMBODIMENT 3 in the other respects with the same film 8b as that of EMBODIMENT 9 being provided to EMBODIMENT 3. Even in such a case, the same effects as those of EMBODIMENT 9 are obtained. In this EMBODIMENT 10, the drain electrode 8 can be separated from the storage capacity electrode 8a as in EMBODIMENT 4, with the same effects as those of EMBODIMENT 9 being provided. In EMBODIMENT 10, the light shielding film 8b is provided on the previous scanning line 2. The light shielding film 8b can be formed in this portion with a portion for forming simultaneously with the scanning wiring 2 being provided somewhere else. By this manner, the same effect can be obtained even in the same configuration as that of EMBODIMENT 7 or EMBODIMENT 8.

EMBODIMENT 11

In EMBODIMENT 9 and EMBODIMENT 10, there is described a method of compensating the change in the quantity of the transmitting light amount by the light shielding film 8b. In this method, the aperture ratio is decreased and the quantity of the transmitting light itself is lowered to increase the area of the light shielding portion although the quantity of the transmitting light can be made constant.

FIG. 28 and FIG. 29 show a sectional illustrating view showing a manufacturing process of EMBODIMENT 11. The feature of this embodiment uses a transparent electrode such as ITO as a drain electrode 8. A manufacturing process will be described according to FIG. 11. As FIGS. 28(a) and 28(b) are the same as in EMBODIMENT 1, the description is omitted. For example, an ITO as a transparent metallic material to a visible ray as the signal wiring 7a and the drain electrode 8c, and, for example, an opaque metallic material such as Cr as a second layer signal wiring 7b and the drain electrode 8d are filmed to conduct a pattern formation. At the same time, the unnecessary n+a-Si is removed to form a source region 6a for obtaining the signal wiring and an ohmic contact, and a drain region 6b for obtaining the ohmic contact (FIG. 28(c)). Then, it is removed except for a portion where light is shielding by the scanning wiring 2, of the drain electrode 8c (FIG. 29(a)). Or all the drain electrode 8d can be removed. Or all the drain electrodes 8d can be removed. As the following manufacturing process is the same as the case of EMBODIMENT 1, the description is omitted. The function of a pixel to be obtained by EMBODIMENT 11 will be described concretely. In a planar construction as in, for example, EMBODIMENT 1, the Cgd is changed in a case where the drain electrode 8c is deviated to the x axial direction Dx to the scanning 2. When the drain electrode 8c is deviated to -x direction to the scanning line 2, the superposing area between the drain electrode 8c and the scanning wiring 2 increases to increase the Cgd. At this time, the superposing area between the drain electrode 8c and Cs wiring in the B—B line to increase the storage capacitance Cs value. When the drain electrode 8c is relatively deviated in the +x direction to the scanning wiring 2, the superposing area between the drain electrode 8c and the scanning wiring 2 decreases to reduce the Cgd. At this time, in the B—B line, the superposing area between the drain electrode 8c and Cs wiring 3 decreases to reduce the storage capacitance Cs value. A liquid crystal displaying apparatus where flickering, image sticking and so on are not caused is obtained if the relative position between the drain electrode 8c and the signal wiring 2 is different in a portion where the exposing region is different by designing the B—B line so that the (1) equation may become constant. As the drain electrode 8c is made of transparent metal to the visible ray, the quantity of the transmitting light amount does not change due to area change by projecting of the drain electrode 8c from the Cs wiring 3 by change in the superposing area between the Cs wiring 3 and the Cs wiring 3. Accordingly, the same effect as that of EMBODIMENT 1 is obtained. The quantity of the transmitting light does not change in a region where the exposing region is different, and the quantity of the transmitting light larger than those of EMBODIMENT 9 and EMBODIMENT 10, thus proving a liquid crystal displaying apparatus which is high in illuminance. The same effect is obtained by any construction shown in EMBODIMENT 1 through EMBODIMENT 8 in planar construction. Although the Cr is used as a material of the signal wiring 7b or a material of the drain electrode 8d, a single layer composed of either of Al, Cu, Mo, Ta, W, Al—Nd, Al—Cu, Al—Si—Cu, Al—Nd nitride, Al—W or the like, a lamination layer construction of proper combination or an alloy including at least one can be used.

EMBODIMENT 12

An EMBODIMENT 12 is one example for preventing the step different cutting, due to a case where the drain electrode 8 becomes narrower in the wiring width by the step difference portion of the Cs wiring 3. FIG. 30 shows a planar view of EMBODIMENT 12. FIG. 31 is a sectional illustrating view taken along a line A—A line of FIG. 30. FIG. 32 is a sectional illustrating view taken along a line of B—B of FIG. 30. As the manufacturing process is the same as that of EMBODIMENT 1, the illustration is omitted. In EMBODIMENT 12, the level difference cutting in the level difference of the Cs wiring 3 is prevented by making the drain electrode 8 thicker in step condition or gradually in wiring width in a portion where the drain electrode 8 covers the level difference to the Cs wiring 3 from the TFT side. For adjustment of the Cs value, the Cs wiring 3 is adjusted by making the wiring width narrower gradually or in step as in the drain electrode 8. Thus, a liquid crystal displaying apparatus can be realized which has an effect the same as that of EMBODIMENT 3, no level difference cutting of the drain electrode 8 in the level difference of the Cs wiring, and high in yield. The same effect is obtained if this construction is applied to the construction of EMBODIMENT 9 or EMBODIMENT 11.

Although in EMBODIMENT 1 through EMBODIMENT 12 of the present invention, a channel etch type inverse staggered construction TFT is used as a TFT construction, the effect can be obtained even by using a channel protective type (etching stopper type) inverse staggered construction TFT. A staggered type TFT or a coplanar type TFT can be used. Although a-Si is used as a semiconductor layer 5, polycrystalline Si can be used. Although the Cr is used as a scanning wiring 2, a single layer composed of either of Al, Cu, Mo, Ta, W, Al—Nd, Al—Cu, Al—Si—Cu, Al—Nd nitride, Al—W or the like, a lamination layer construction of proper combination or an alloy including at least one can be used. Although the Cr is used as the Cs wiring, a single layer composed of either of Al, Cu, Mo, Ta, W, Al—Nd, Al—Cu, Al—Si—Cu, Al—Nd nitride, Al—W or the like, a lamination layer construction of proper combination or an alloy including at least one can be used. Although the Cr is used as the signal wiring 7 or the drain electrode 8, a single layer composed of either of Al, Cu, Mo, Ta, W, Al—Nd, Al—Cu, Al—Si—Cu, Al—Nd nitride, Al—W or the like, a lamination layer construction of proper combination or an alloy including at least one can be used. The signal wiring 7 can be made of these metallic single layer or the lamination construction, or the lamination layer construction of ITO and these metals. The drain electrode 8 or one portion of the drain electrode 8 can be made of ITO. Although the ITO is used as the pixel electrode 12 is used, the same effect is provided even if the $SnO_2$ is used. Although the SiN is used as the gate insulating film 4 or the passivation film 9, it can be made of lamination construction of $SiO_2$, or SiN and $SiO_2$. Although the passivation film 9 is used in EMBODIMENT of the present invention, the same effect can be obtained even if the construction has no passivation film 9. Although the acrylic resin is used as a transparent insulating film 10, the effect is the same if transparent insulating film such as organic resin, non-photosensitive resin, benzocyclobutene or the like is used.

A liquid crystal displaying apparatus of the present invention has;

(a-1) a plurality of scanning wirings and a plurality of signal wirings respectively arranged in a row direction and a column direction, (a-2) a TFT arranged in a matrix condition and controlled by the scanning wiring and the signal wiring, (a-3) wherein the pixel electrode to be connected with the TFT is formed, the storage capacitance for storing the electric charge is connected with the pixel electrode, the electrode for forming the storage capacitance opposite to the electrode for forming the storage capacitance and the drain electrode of the TFT are formed at the same time, and the scanning wiring and the electrode for forming the storage capacitance are formed by the same step, the pixel electrode is a liquid crystal displaying apparatus provided with an array substrate superposed on the scanning wiring and the signal wiring through the transparent insulating film and (b) an counter substrate having a common electrode arranged opposite to the pixel electrode, the change in the ΔVgd due to changes in the Cgd to be caused for each exposing area is adapted to be compensated by changing the Cs value for each exposing region, the ΔVgd value becomes constant even if the exposing region is different, and displaying quality reduction such as flickering, image sticking, ununiformly displaying and so on can be prevented, whereby a liquid crystal displaying apparatus is obtained which is high in display quality, easy to manufacture and high in yield.

A liquid crystal displaying apparatus of the present invention increases an area for forming the storage capacitance when the superposing area between the scanning wiring and the drain electrode increases, and decreases an area for forming the storage capacitance when the superposing area between the scanning wiring and the drain electrode decreases, the ΔVgd can make constant, displaying quality reduction such as flickering, image sticking, ununiformly displaying and so on can be prevented, whereby a liquid crystal displaying apparatus is obtained which is high in display quality, easy to manufacture and high in yield.

A liquid crystal displaying apparatus of the present invention is adapted to change the Cs value so that (1) equation ΔVgd=(Cgd×ΔVg)/(Cgd+Cs+Clc) may become a constant value if the Cgd is varied. The quantity of the transmission light of one pixel of the liquid crystal displaying apparatus does not change if the Cs value changes by provision of contributing changes in aperture ratio in causing the area of the exposing portion change by changing of the Cs value for each exposing region. Thus, the ΔVgd is constant even if the exposing regions are different, the quantity of the transmission light can be made unchanged, and the displaying quality reduction such as flickering, image sticking, ununiformly displaying and so on can be prevented. Thus, a liquid crystal displaying apparatus of better displaying quality which is free from ununiformly displaying by changing among the exposing regions in the quantity of the transmitting light can be obtained wherein the manufacturing is easy and the yielding is high.

In a liquid crystal apparatus of the present invention, as the quantity of the transmission light for transmitting the aperturepotion does not change even if the area of the storage capacitance is increased and decreased, displaying quality reduction such as flickering, image sticking, ununiformly displaying and so on can be prevented, whereby a liquid crystal displaying apparatus which is better in display quality, easy to manufacture and high in yield is obtained, wherein the ununiformly displaying caused by changing among the exposing regions in the quantity of the transmitting light is not provided.

In a liquid crystal apparatus of the present invention, at least one portion of the drain electrode is a transparent electrode. As the quantity of the transmitting light of one pixel of the liquid crystal displaying apparatus does not change if the Cs value changes by using the transparent drain electrode, the ΔVgd is constant even if the exposing regions are different, the quantity of the transmission light can be made unchanged, the aperture ratio is not necessary to be reduced, and displaying quality reduction such as flickering, image sticking, ununiformly displaying and so on can be prevented. A liquid crystal displaying apparatus of better displaying quantity which is free from ununiformly displaying and high in illuminance due to no changing among the exposing regions in the quantity of the transmitting light can be obtained, wherein the manufacturing is easier and the yielding is higher.

In a liquid crystal apparatus of the present invention, the width of the drain electrode is changed at steps or gradually to prevent the level difference cutting at the step difference of another electrode by improving the wiring shape for forming the drain electrode and the storage capacitance, and the drain electrode prevents the level cutting in the level difference to the wiring for forming the storage capacitance. Thus, the ΔVgd is constant even if the exposing regions are different, and the displaying quality reduction such as flickering, image sticking, ununiformly displaying and so on can be prevented. A liquid crystal displaying apparatus which is high in yield can be obtained.

In a liquid crystal displaying apparatus of the present invention, the aperture ratio to be caused with increase and decrease in the area of the storage capacitance does not change, and the light shielding portion becomes small when the area of the storage capacitance increases, and the area of the light shielding portion becomes large when the area of the storage capacitance becomes small. Thus, the displaying quality reduction such as flickering, image sticking, ununiformly displaying and so on can be prevented. A liquid crystal displaying apparatus which is free from ununiformly displaying and high in illuminance and better in displaying quality can be obtained, where the construction is easy and the yield is high, because the quantity of the transmission light does not change among the exposing regions.

What is claimed is:

1. A liquid crystal displaying apparatus comprising:
   a plurality of scanning wirings and a plurality of signal wirings arranged respectively in a row direction and a column direction,
   a TFT arranged in a matrix condition and controlled by respective of the scanning wirings and the signal wirings;
   a pixel electrode connected with the TFT;
   a second electrode connected to the pixel electrode, and a storage capacitance line for forming a storage capacitance with a storage capacitance value Cs, and wherein the second electrode superposes a part of the scanning wirings to form a coupling capacitance Cgd;
   an array substrate, wherein the pixel electrode is superposed on the scanning wiring and the signal wiring through a transparent insulating film, and
   a counter substrate with a common electrode arranged opposite to the pixel electrode,
      wherein the storage capacitance line and the second electrode are shaped so that as Cs increases Cgd increases, and as Cs decreases Cgd decreases;
      wherein an aperture ratio is not changed with an increase and decrease in area of the storage capacitance line.

2. A liquid crystal displaying apparatus comprising:
   a plurality of scanning wirings and a plurality of signal wirings arranged respectively in a row direction and a column direction,
   a TFT arranged in a matrix condition and controlled by respective of the scanning wirings and the signal wirings;
   a pixel electrode connected with the TFT;
   a second electrode connected to the pixel electrode and a storage capacitance line for forming a storage capacitance with a storage capacitance value Cs, and wherein the second electrode superposes a part of the scanning wirings to form a coupling capacitance Cgd;
   an array substrate, wherein the pixel electrode is superposed on the scanning wiring and the signal wiring through a transparent insulating film, and
   a counter substrate with a common electrode arranged opposite to the pixel electrode,
      wherein the storage capacitance line and the second electrode are shaped so that as Cs increases Cgd increases, and as Cs decreases Cgd decreases,
      wherein a transmission amount for transmitting an opening portion does not change even if an area of the storage capacitance line is increased and decreased.

3. The liquid crystal displaying apparatus of claim 2, wherein at least one portion of the second electrode is a transparent electrode.

4. A liquid crystal displaying apparatus comprising:
   a plurality of scanning wirings and a plurality of signal wirings arranged respectively in a row direction and a column direction,
   a TFT arranged in a matrix condition and controlled by respective of the scanning wirings and the signal wirings;
   a pixel electrode connected with the TFT;
   a second electrode connected to the pixel electrode and a storage capacitance line for forming a storage capacitance with a storage capacitance value Cs, and wherein the second electrode superposes a part of the scanning wirings to form a coupling capacitance Cgd;
   an array substrate, wherein the pixel electrode is superposed on the scanning wiring and the signal wiring through a transparent insulating film, and
   a counter substrate with a common electrode arranged opposite to the pixel electrode,
      wherein the storage capacitance line and the second electrode are shaped so that as Cs increases Cgd increases, and as Cs decreases Cgd decreases;
      wherein a width of the second electrode varies gradually.

5. A liquid crystal display apparatus comprising:
   a plurality of scanning wirings and a plurality of signal wirings arranged respectively in a row direction and a column direction,
   a TFT arranged in a matrix condition and controlled by respective of the scanning wirings and the signal wirings;
   a pixel electrode connected with the TFT;
   a second electrode connected to the pixel electrode and a storage capacitance line for forming a storage capacitance with a storage capacitance value Cs, and wherein the second electrode superposes a part of the scanning wirings to form a coupling capacitance Cgd;
   an array substrate, wherein the pixel electrode is superposed on the scanning wiring and the signal wiring through a transparent insulating film, and
   a counter substrate with a common electrode arranged opposite to the pixel electrode,
      wherein the storage capacitance line and the second electrode are shaped so that as Cs increases Cgd increases, and as Cs decreases Cgd decreases;
      wherein the second electrode is separated into two parts, one for forming the storage capacitance $C_s$ and the other for forming the coupling capacitance $C_{gd}$, and said two parts being connected together with the pixel electrode.

* * * * *